US009824023B2

United States Patent
Lu

(10) Patent No.: US 9,824,023 B2
(45) Date of Patent: Nov. 21, 2017

(54) MANAGEMENT METHOD OF VIRTUAL-TO-PHYSICAL ADDRESS TRANSLATION SYSTEM USING PART OF BITS OF VIRTUAL ADDRESS AS INDEX

(71) Applicant: Realtek Semiconductor Corp., HsinChu (TW)

(72) Inventor: Yen-Ju Lu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 9 days.

(21) Appl. No.: 14/547,110

(22) Filed: Nov. 18, 2014

(65) Prior Publication Data
US 2015/0149743 A1   May 28, 2015

(30) Foreign Application Priority Data
Nov. 27, 2013 (TW) .............................. 102143294 A

(51) Int. Cl.
*G06F 12/10* (2016.01)
*G06F 12/1027* (2016.01)

(52) U.S. Cl.
CPC .. *G06F 12/1027* (2013.01); *G06F 2212/1016* (2013.01); *G06F 2212/1041* (2013.01); *G06F 2212/681* (2013.01)

(58) Field of Classification Search
CPC ......... G06F 12/1027; G06F 2212/1016; G06F 2212/1041; G06F 12/10; G06F 2212/00;
(Continued)

(56) References Cited

U.S. PATENT DOCUMENTS 5,060,137 A  *  10/1991  Bryg ................... G06F 12/1027
                                                         711/205
5,479,627 A  *  12/1995  Khalidi ............... G06F 12/1027
                                                         711/205
(Continued)

FOREIGN PATENT DOCUMENTS

CN           101178701 A         5/2008
CN           101727405 A         6/2010
(Continued)

*Primary Examiner* — Mano Padmanabhan
*Assistant Examiner* — Jean Edouard
(74) *Attorney, Agent, or Firm* — Winston Hsu

(57) ABSTRACT

A management method of a virtual-to-physical address translation system includes the following steps: providing a first storage space, wherein the first storage space includes a plurality of buffer entries; providing a second storage space, wherein the second storage space includes a plurality of translation entries, and the translation entries correspond to a plurality of translation indices; and when receiving a write instruction to write a first virtual-to-physical address translation into a specific buffer entry of the buffer entries, storing the first virtual-to-physical address translation in a write translation entry of the translation entries according to a first part of bits of a first virtual address corresponding to the first virtual-to-physical address translation, and storing the first virtual address and a write translation index corresponding to the write translation entry in the specific buffer entry.

18 Claims, 14 Drawing Sheets

(58) Field of Classification Search
CPC ........... G06F 12/1036; G06F 2212/652; G06F 12/1054; G06F 12/1081
See application file for complete search history.

(56) References Cited

U.S. PATENT DOCUMENTS

| | | | | |
|---|---|---|---|---|
| 5,835,963 A * | 11/1998 | Yoshioka | ............ | G06F 12/1054 365/49.17 |
| 5,928,352 A * | 7/1999 | Gochman | ........... | G06F 12/1027 711/200 |
| 6,014,737 A * | 1/2000 | Kurata | ................. | G06F 9/3834 712/219 |
| 6,092,172 A * | 7/2000 | Nishimoto | .......... | G06F 12/1027 711/203 |
| 6,212,613 B1 * | 4/2001 | Belair | ................. | G06F 12/1027 711/207 |
| 6,308,247 B1 * | 10/2001 | Ackerman | .......... | G06F 12/1036 711/202 |
| 6,519,684 B1 * | 2/2003 | Moyer | ................. | G06F 12/121 711/134 |
| 6,684,305 B1 * | 1/2004 | Deneau | ............... | G06F 12/1072 711/133 |
| 6,854,046 B1 * | 2/2005 | Evans | ................ | G06F 12/1036 711/203 |
| 8,631,206 B1 * | 1/2014 | O'Bleness | .......... | G06F 12/0864 711/128 |
| 2001/0027512 A1 | 10/2001 | Hagersten | ........... | G06F 11/0712 711/202 |
| 2002/0116590 A1 * | 8/2002 | Franaszek | ............ | G06F 12/023 711/170 |
| 2002/0144001 A1 * | 10/2002 | Collins | ............... | G06F 12/1081 709/250 |
| 2002/0144078 A1 * | 10/2002 | Topham | .............. | G06F 12/1054 711/203 |
| 2003/0115611 A1 | 6/2003 | Hilts | | |
| 2004/0024986 A1 * | 2/2004 | Devereux | ............ | G06F 12/126 711/205 |
| 2004/0085849 A1 * | 5/2004 | Myoung | ............ | G06F 12/0246 365/232 |
| 2005/0038973 A1 * | 2/2005 | Ito | ...................... | G06F 12/1027 711/207 |
| 2005/0172099 A1 * | 8/2005 | Lowe | ................. | G06F 12/1027 711/207 |
| 2006/0004941 A1 * | 1/2006 | Shah | ................... | G06F 12/1027 711/3 |
| 2006/0179233 A1 * | 8/2006 | Hagspiel | ............. | G06F 12/0864 711/136 |
| 2007/0094475 A1 * | 4/2007 | Bridges | ............... | G06F 12/1054 711/207 |
| 2008/0162868 A1 * | 7/2008 | Glew | .................. | G06F 12/1027 711/203 |
| 2009/0100054 A1 * | 4/2009 | Croxford | ............ | G06F 12/0864 |
| 2009/0172343 A1 * | 7/2009 | Savagaonkar | ....... | G06F 12/1036 711/207 |
| 2009/0172348 A1 | 7/2009 | Cavin | | |
| 2009/0187727 A1 * | 7/2009 | Caprioli | ............. | G06F 12/0864 711/205 |
| 2010/0161875 A1 * | 6/2010 | Chang | ................. | G06F 12/1036 711/6 |
| 2011/0040950 A1 * | 2/2011 | Handgen | ............. | G06F 12/1027 711/206 |
| 2011/0055458 A1 * | 3/2011 | Kuehne | ............... | G06F 12/0246 711/103 |
| 2013/0024647 A1 * | 1/2013 | Gove | .................... | G06F 12/084 711/207 |
| 2013/0173882 A1 * | 7/2013 | Bhowmik | ........... | G06F 12/1036 711/207 |
| 2013/0238875 A1 * | 9/2013 | Ramaraju | ........... | G06F 12/1027 711/207 |
| 2013/0246732 A1 * | 9/2013 | Seng | ................... | G06F 12/0246 711/203 |
| 2013/0339659 A1 * | 12/2013 | Bybell | ................ | G06F 12/1027 711/207 |
| 2013/0346720 A1 * | 12/2013 | Colgrove | ............ | G06F 3/0608 711/165 |
| 2014/0108766 A1 * | 4/2014 | Desai | .................. | G06F 12/1027 711/205 |
| 2014/0281366 A1 * | 9/2014 | Felch | .................. | G06F 12/0886 711/207 |
| 2014/0379956 A1 * | 12/2014 | Chang | ................ | G06F 12/1027 711/6 |

FOREIGN PATENT DOCUMENTS

| | | |
|---|---|---|
| TW | 201337557 | 9/2013 |
| TW | 201346754 | 11/2013 |

* cited by examiner

MANAGEMENT METHOD OF VIRTUAL-TO-PHYSICAL ADDRESS TRANSLATION SYSTEM USING PART OF BITS OF VIRTUAL ADDRESS AS INDEX

BACKGROUND OF THE INVENTION

1. Field of the Invention

The disclosed embodiments of the present invention relate to memory management, and more particularly, to a management method of a virtual-to-physical address translation system, which uses a part of bits of a virtual address as an index, and a related virtual-to-physical address translation system.

2. Description of the Prior Art

A conventional memory management unit employs a translation lookaside buffer (TLB) to improve search efficiency of a page table. For example, a TLB employed in a Microcomputer without Interlocked Pipeline Stages (MIPS) may have a plurality of entries (e.g. 64 entries) for fast lookup, wherein each entry may store a virtual-to-physical address translation associated with a virtual address and a physical address.

During a lookup process of the aforementioned TLB, it is necessary to compare a virtual address to be looked up with a virtual address stored in each entry (i.e. fully-associative mapping). In other words, a plurality of comparator circuits are required. Hence, if the number of entries of the TLB is increased to improve system performance, a circuit area of the TLB increases, thus lowering processing speed. However, if the number of entries of the TLB is decreased, the system performance is degraded (e.g. probability of a TLB miss increases).

Thus, a virtual-to-physical address translation system, which may improve system performance without scarifying a circuit area and a processing speed, is needed.

SUMMARY OF THE INVENTION

It is therefore one objective of the present invention to provide a management method of a virtual-to-physical address translation system, which uses a part of bits of a virtual address as an index, and a related virtual-to-physical address translation system to solve the above problems.

According to an embodiment of the present invention, an exemplary management method of a virtual-to-physical address translation system is disclosed. The exemplary management method comprises the following steps: providing a first storage space, wherein the first storage space comprises a plurality of buffer entries; providing a second storage space, wherein the second storage space comprises a plurality of translation entries, and the translation entries correspond to a plurality of translation indices; and when receiving a write instruction to write a first virtual-to-physical address translation into a specific buffer entry of the buffer entries, storing the first virtual-to-physical address translation in a write translation entry of the translation entries according to a first part of bits of a first virtual address corresponding to the first virtual-to-physical address translation, and storing the first virtual address and a write translation index corresponding to the write translation entry in the specific buffer entry.

According to an embodiment of the present invention, another exemplary management method of a virtual-to-physical address translation system is disclosed. The exemplary management method comprises the following steps: providing a storage space, wherein the storage space comprises a plurality of translation entries, the translation entries store at least one virtual-to-physical address translation, and the translation entries correspond to a plurality of translation indices respectively; and when receiving a read instruction to read out a physical address corresponding to a virtual address, reading out the physical address from the storage space according to a part of bits of the virtual address.

According to an embodiment of the present invention, an exemplary virtual-to-physical address translation system is disclosed. The exemplary virtual-to-physical address translation system comprises a first storage space, a second storage space and a processing circuit. The first storage space comprises a plurality of buffer entries. The second storage space comprises a plurality of translation entries, wherein the translation entries correspond to a plurality of translation indices. The processing circuit is coupled to the first storage space and the second storage space. When the virtual-to-physical address translation system receives a write instruction to write a first virtual-to-physical address translation into a specific buffer entry of the buffer entries, the processing circuit stores the first virtual-to-physical address translation in a write translation entry of the translation entries according to a first part of bits of a first virtual address corresponding to the first virtual-to-physical address translation, and stores the first virtual address and a write translation index corresponding to the write translation entry in the specific buffer entry.

According to an embodiment of the present invention, another exemplary virtual-to-physical address translation system is disclosed. The exemplary virtual-to-physical address translation system comprises a storage space and a processing circuit. The storage space comprises a plurality of translation entries, wherein the translation entries store at least one virtual-to-physical address translation, and correspond to a plurality of translation indices respectively. The processing circuit is coupled to the storage space. When the virtual-to-physical address translation system receives a read instruction to read out a physical address corresponding to a virtual address, the processing circuit reads out the physical address from the storage space according to a part of bits of the virtual address.

The proposed virtual-to-physical address translation system and management method thereof may store mass translation data, and merge associated virtual-to-physical address translations or store them in adjacent entry(ies). Hence, the proposed virtual-to-physical address translation system and management method thereof may improve system performance without lowering a processing speed or greatly increasing a circuit area. Additionally, the proposed virtual-to-physical address translation system and management method thereof may compatible with instructions from a MIPS.

These and other objectives of the present invention will no doubt become obvious to those of ordinary skill in the art after reading the following detailed description of the preferred embodiment that is illustrated in the various figures and drawings.

DETAILED DESCRIPTION

In order to improve system performance without greatly increasing a circuit area, the proposed virtual-to-physical address translation system (or related management method) uses apart of bits of a virtual address as an index so as to looks up a physical address corresponding to the virtual address according to the index. In addition, the proposed virtual-to-physical address translation system may utilize a large capacity memory to provide more TLB entries, thus enhancing the system performance greatly and decreasing the number of comparator circuits required in a lookup process.

Figure 1:
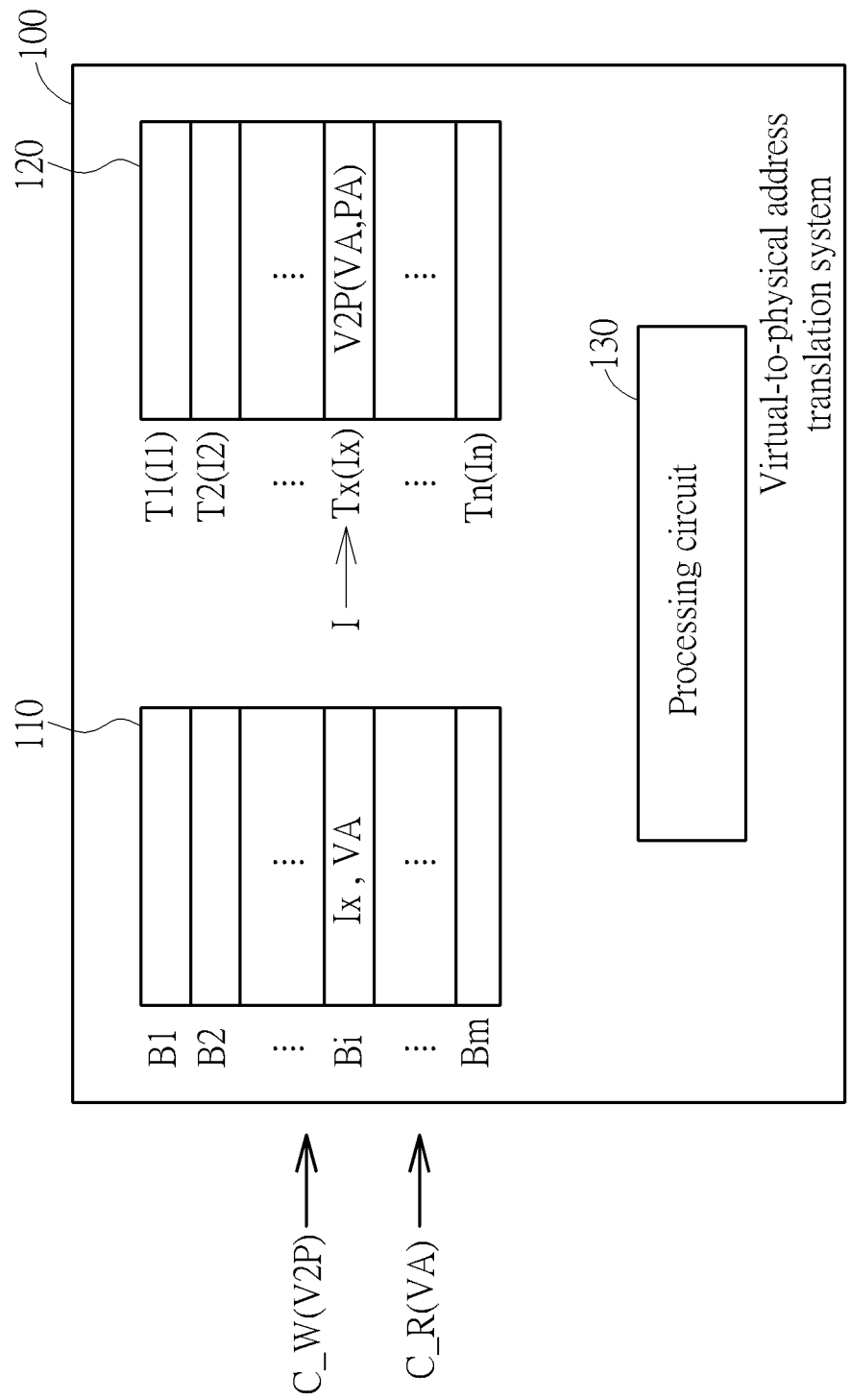
FIG. 1 is an exemplary virtual-to-physical address translation system according to an embodiment of the present invention.

Please refer to FIG. 1, which is an exemplary virtual-to-physical address translation system according to an embodiment of the present invention. The virtual-to-physical address translation system 100 may include a first storage space 110, a second storage space 120 and a processing circuit 130. The first storage space 110 may include a plurality of buffer entries B1-Bm, and the second storage space 120 may include a plurality of translation entries T1-Tn. By way of example but not limitation, each of the first storage space 110 and the second storage space 120 may be implemented by a static random access memory (SRAM) to provide more buffer entries and translation entries. In addition, the translation entries T1-Tn may correspond to a plurality of translation indices I1-In respectively.

The processing circuit 130 is coupled to the first storage space 110 and the second storage space 120. When the virtual-to-physical address translation system 100 receives a write instruction C_W to write a virtual-to-physical address translation V2P into a specific buffer entry Bi of the buffer entries B1-Bm, the processing circuit 130 may store the virtual-to-physical address translation V2P (e.g. a virtual address VA and a corresponding physical address PA) in a write translation entry Tx of the translation entries T1-Tn according to a part of bits of the virtual address VA corresponding to the virtual-to-physical address translation V2P, and store the virtual address VA and a write translation index Ix (corresponding to the write translation entry Tx) in the specific buffer entry Bi. For example, the processing circuit 130 may use the part of the bits of the virtual address VA as a virtual index I, and refer to the virtual index I to direct to a corresponding translation index (e.g. the write translation index Ix), thereby storing the virtual-to-physical address translation V2P in the write translation entry Tx (assuming that the write translation entry Tx is available). Specifically, the virtual address VA and the write translation index Ix may be stored in the specific buffer entry Bi of the first storage space 110, and the virtual-to-physical address translation V2P may be stored in the write translation entry Tx of the second storage space 120. Please note that the address translation stored in the first storage space 110 may imply the address translation stored in the second storage space 120. Hence, when the virtual-to-physical address translation system 100 receives a read instruction C_R to read out/look up the physical address PA corresponding to the virtual address VA, the processing circuit 130 may read out the physical address PA from the second storage space 120 according to the part of the bits of the virtual address VA (i.e. the virtual index I) without comparing the virtual address VA with each virtual address stored in the first storage space 110.

The first storage space 110 may be regarded as a TLB entry table, which may be controlled by conventional TLB instructions. The second storage space 120 may be regarded as a virtual-to-physical address translation table. At least one of the translation entries T1-Tn may include a plurality of slots, and the slots may be arranged for storing a plurality of virtual-to-physical address translations to improve translation performance. Please refer to FIG. 2, which is an exemplary virtual-to-physical address translation system according to another embodiment of the present invention. The architecture of the virtual-to-physical address translation system 200 is based on that of the virtual-to-physical address translation system 100 shown in FIG. 1. Hence, the virtual-to-physical address translation system 200 may include a first storage space 210, a second storage space 220 and a processing circuit 230, wherein the first storage space 110, the second storage space 120 and the processing circuit 130 shown in FIG. 1 may be implemented by the first storage space 210, the second storage space 220 and the processing circuit 230, respectively. By way of example but not limitation, the first storage space 210 may include 1024 buffer entries, and the second storage space 220 may include 128 translation entries. The second storage space 220 may include a virtual address table 224 and a physical address table 226, wherein the virtual address table 224 and the physical address table 226 are used for storing a plurality of virtual addresses and a plurality of physical addresses, respectively. Additionally, the second storage space 220 may operate in a multi-way access manner. Hence, each translation entry may include a plurality of slots to store a plurality of virtual-to-physical address translations (e.g. a plurality of virtual addresses and a plurality of physical addresses).

Figure 2:
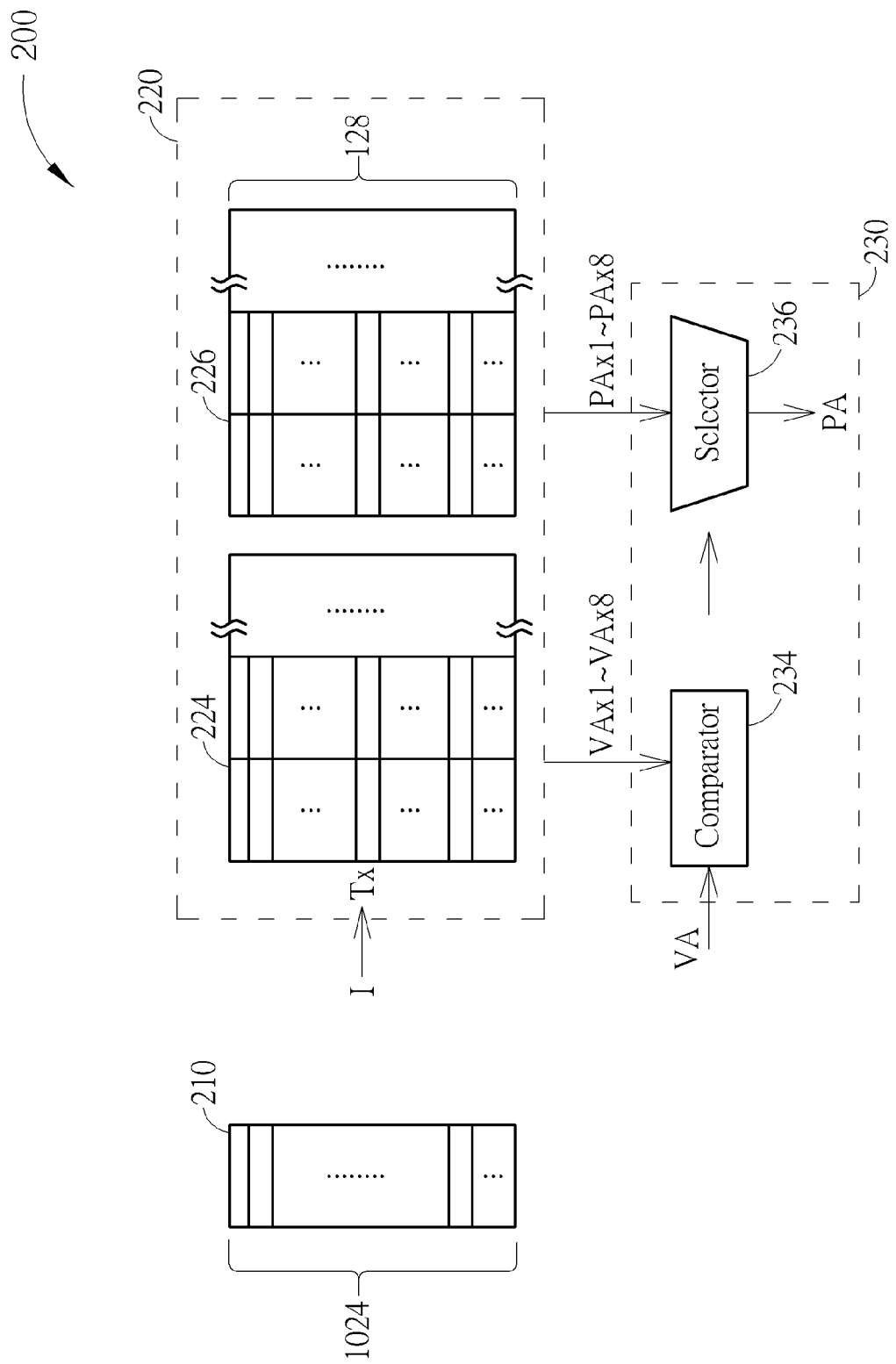
FIG. 2 is an exemplary virtual-to-physical address translation system according to another embodiment of the present invention.

The processing circuit 230 may include a comparator 234 and a selector 236. In this embodiment, when intending to look up the physical address PA corresponding to the virtual address VA, the virtual-to-physical address translation system 200 may use a part of bits of the virtual address VA as the virtual index I, and accordingly direct to the translation entry Tx. The comparator 234 may compare the virtual address VA with a plurality of virtual addresses VAx1-VAx8 stored in the slots (e.g. 8 slots) of the translation entry Tx. Next, the selector 236 may refer to an output of the comparator 234 to obtain a proper physical address (i.e. the physical address PA corresponding to the virtual address VA) from a plurality of physical addresses PAx1-PAx8 (corresponding to the virtual addresses VAx1-VAx8 respectively). As shown in FIG. 2, the processing circuit 230 may employ the single comparator 234 to complete lookup operations, thus greatly increasing operating speed of the virtual-to-physical address translation system 200 and reducing the required circuit area.

Figure 3:
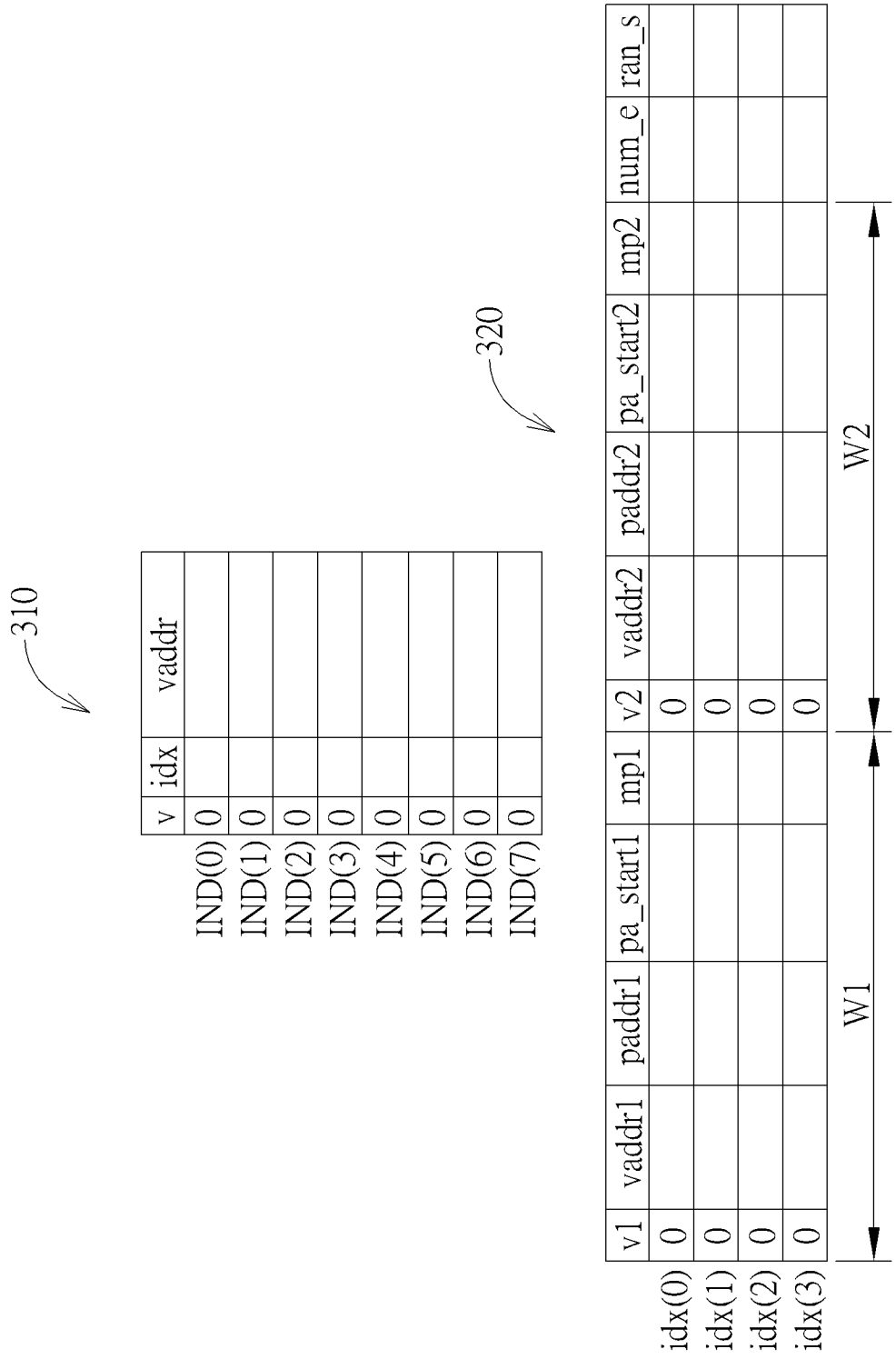
FIG. 3 is an implementation of the first storage space and the second storage space shown in FIG. 1.

For a better understanding of the proposed virtual-to-physical address translation system and related management method, please refer to implementations of management operations in a virtual-to-physical address translation system shown in FIGS. 3-9. FIG. 3 is an implementation of the first storage space 110 and the second storage space 120 shown in FIG. 1. In this implementation, the first storage space 310 includes a plurality of buffer entries, which correspond to a plurality of buffer indices IND(0)-IND(7) (having index values 0-7) respectively. Each buffer entry includes a valid bit field v, a translation index field idx, and a virtual address field vaddr. An initial value of the valid bit field v of each buffer entry may be set to zero, which represents that no data is stored therein. The translation index field idx may be used to store a translation index, and the virtual address field vaddr may be used to store a virtual address. For the sake of brevity, an address-space identifier field (ASID field), a dirty bit field and a global bit field in the first storage space 310 (e.g. a TLB entry table) are not shown in FIG. 3. In addition, as a person skilled in the art should understand the purposes of the ASID field, the dirty bit field and the global bit field, further description is omitted here.

The second storage space 320 (e.g. a virtual-to-physical address translation table) may include a plurality of translation entries, wherein the translation entries correspond to a plurality of translation indices idx(0)-idx(3) (having index values 0-3) respectively. Additionally, the second storage space 320 may operate in a multi-way access manner (i.e. a plurality of ways W1 and W2). The way W1 may include a valid bit field v1, a virtual address field vaddr1, a physical address field paddr1, a physical page start field pa_start1, and a multi-page field mp1. An initial value of the valid bit field v1 may be set to zero, which represents that no data is stored therein. The virtual address field vaddr1 may store a virtual address, and the physical address field paddr1 may store a physical address corresponding to the virtual address. The physical page start field pa_start1 may store a starting address of a physical page which the physical address belongs to. The multi-page field mp1 may indicate page number(s) of physical page(s) to which physical address(es) stored in the corresponding slot belongs. Further description of the multi-page field mp1/mp2 will be provided later. Similar to the description above regarding the way W1, the way W2 may include a valid bit field v2, a virtual address field vaddr2, a physical address field paddr2, a physical page start field pa_start2, and the multi-page field mp2. In other words, each translation entry may include two slots to store a plurality of virtual-to-physical address translations.

Each translation entry may further include an offset status field, which may indicate the number of virtual-to-physical address translations stored in another translation entry due to unavailability of a current translation entry (i.e. an escape number field num_e) and indicate the number of translation entries between the another translation entry and the current translation entry (i.e. a search range field ran_s). Further description of the offset status field will be provided later.

Please note that the above is for illustrative purposes only, and is not meant to be a limitation of the present invention. For example, the number of buffer entries of the first storage space 310 is not limited to eight, and the number of translation entries of the second storage space 320 is not limited to four. Further, the second storage space 320 may operate in another multi-way access manner (e.g. more than or equal to three ways).

Figure 4:
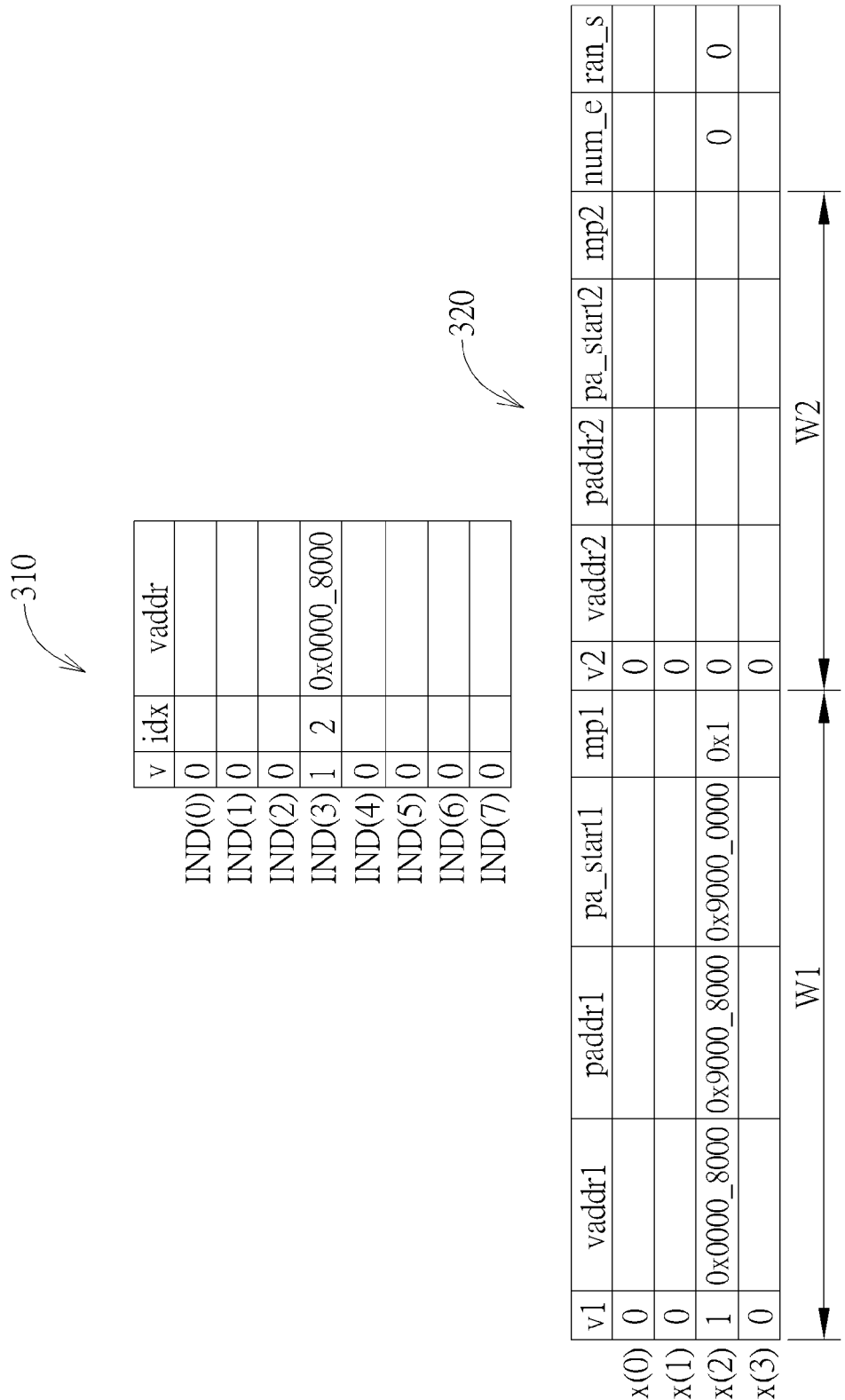
FIG. 4 is an implementation of a virtual-to-physical address translating operation performed in the first storage space and the second storage space shown in FIG. 3.

Please refer to FIG. 4 in conjunction with FIG. 3. FIG. 4 is an implementation of a virtual-to-physical address translating operation performed in the first storage space 310 and the second storage space 320 shown in FIG. 3. In this implementation, a virtual-to-physical address translation system (including the first storage space 310 and the second storage space 320; not shown in FIG. 4) receives a write instruction (e.g. a MIPS instruction TLBWI/TLBWR), which is used to write a virtual-to-physical address translation (corresponding to a virtual address 0x0000_8000 and a physical address 0x9000_0000) into the buffer entry corresponding to the buffer index IND(3) in the TLB entry table (i.e. the first storage space 310). Please note that each of the virtual address 0x0000_8000 and the physical address 0x9000_0000 is represented in hexadecimal format (i.e. using a prefix '0x' to indicate a hexadecimal representation).

For illustrative purposes, a page size is four kilobytes (KB) in this implementation. Hence, first to twelfth bits [11:0] (i.e. the 12 least significant bits (LSBs)) of a virtual address (e.g. the virtual address 0x0000_8000) corresponds to a 4 KB page range, and first to twelfth bits [11:0] (i.e. the 12 LSBs) of a physical address (e.g. the physical address 0x9000_0000) corresponds to a 4 KB page range. Thirteenth and fourteenth bits [13:12] of a virtual address may specify the number of mergeable pages. By way of example but not limitation, as thirteenth and fourteenth bits [13:12] of a virtual address may form four different bit patterns '00', '01', '10' and '11', four contiguous physical pages may be merged into a merged page. Specifically, if virtual addresses 0x0000_8000, 0x0000_9000, 0x0000_a000 and 0x0000_b000 correspond to physical addresses 0x9000_0000, 0x9000_1000, 0x9000_2000 and 0x9000_3000 respectively, four contiguous physical pages (corresponding to the physical addresses 0x9000_0000, 0x9000_1000, 0x9000_2000 and 0x9000_3000, whose bits [13:12] have bit patterns '00', '01', '10' and '11' respectively) may be merged into a merged page. The physical addresses 0x9000_0000, 0x9000_1000, 0x9000_2000 and 0x9000_3000 may be regarded as first to fourth pages of the merged page respectively.

Fifteenth and sixteenth bits [15:14] of a virtual address may specify a virtual index used for directing to a virtual-to-physical address translation table (i.e. the second storage space 320). By way of example but not limitation, the virtual address 0x0000_8000 (whose bits [15:14] have a bit pattern '10') may direct to a translation entry corresponding to the translation index idx(2). In other words, the proposed translation system may refer to a part of bits of a virtual address (e.g. the fifteenth and sixteenth bits [15:14] of the virtual address 0x0000_8000) to direct to a translation entry corresponding to a bit pattern of the part of the bits. For example, a bit pattern '10' corresponds to a decimal value 2 and hence can be used to direct to the translation index idx(2). Further, seventeenth to thirty-second bits [31:16] of a virtual address may be used for identifying contents of the virtual address.

It should be noted that, as two bits of a virtual address are used as an index in this implementation, every virtual address may correspond to one of the translation entries of the second storage space 320. In other words, the translation entries of the second storage space 320 may correspond to a plurality of bit patterns (i.e. '00', '01', '10' and '11') respectively, wherein the bit patterns are formed according to the number of bits of a part of bits (i.e. bits [15:14]) of a virtual address.

In this implementation, when an instruction used to write the virtual-to-physical address translation of the virtual address 0x0000_8000 into a specific buffer entry (corresponding to the buffer index IND(3)) is received, a processing circuit corresponding to the first storage space 310 and the second storage space 320 (e.g. the processing circuit shown in FIG. 1/FIG. 2; not shown in FIG. 4) may write the virtual-to-physical address translation into a write translation entry according to the bits [15:14] of the virtual address 0x0000_8000 (i.e. a virtual index). Specifically, the processing circuit may refer to a bit pattern '10' of the bits [15:14] of the virtual address 0x0000_8000 to direct to the translation entry (corresponding to the translation index idx(2)) of the translation entries, and use the translation entry as a currently directed translation entry, wherein the translation index idx(2) corresponds to the bit pattern '10' of the part of the bits [15:14] of the virtual address 0x0000_8000. In other words, an index value of the translation index idx(2) (i.e. 2) equals to a value of a binary number '10'.

Next, the processing circuit may determine if the currently directed translation entry is available and accordingly generate a determination result. The processing circuit may store the virtual-to-physical address translation in the write translation entry according to the determination result. As shown in FIG. 3, no virtual-to-physical address translation is stored in the translation entry corresponding to the translation index idx(2). This means that the currently directed translation entry is available. Hence, as shown in FIG. 4, the processing circuit may store the virtual address 0x0000_8000 and the physical address 0x9000_0000 in the translation entry directly to complete the storage of the virtual-to-physical address translation of the virtual address 0x0000_8000 in the write entry (the translation entry corresponding to the translation index idx(2)). Additionally, the valid bit field v1 is set to 1 to indicate that data is stored therein. The physical page start field pa_start1 is set to 0x9000_0000, and the multi-page field mp1 is set to 0x1. In other words, a page corresponding to the physical address 0x9000_0000 is the first page of a physical page having the starting address 0x9000_0000.

Further, the processing circuit may store the virtual address 0x0000_8000 and a write translation index (i.e. the translation index idx(2)) corresponding to the write translation entry in the specific buffer entry (corresponding to the buffer index IND(3)). For example, the translation index field idx of the specific buffer entry may be set to 2 (the index value of the translation index idx(2)). In addition, the valid bit field v of the specific buffer entry may be set to 1.

Figure 5:
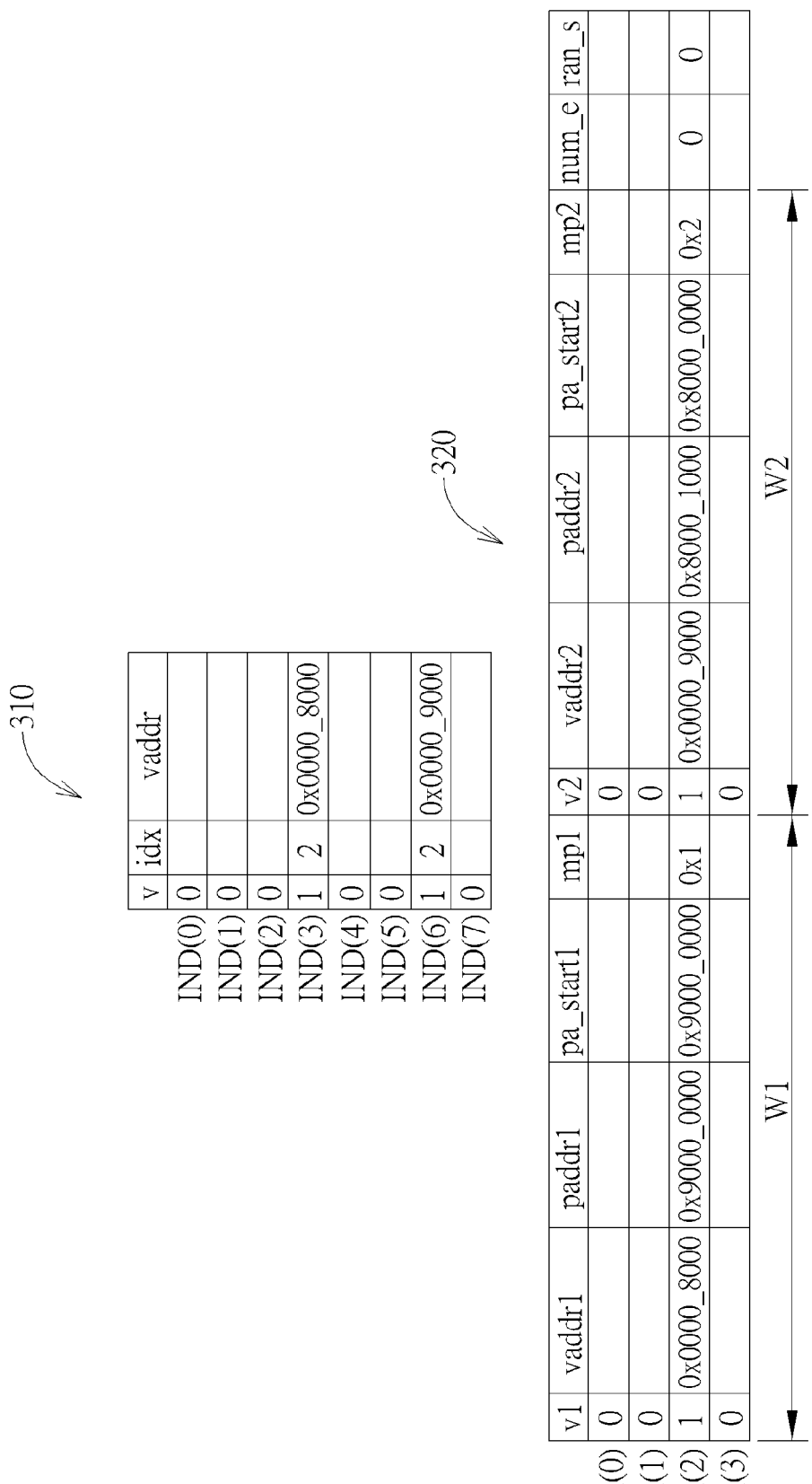
FIG. 5 is an implementation of a virtual-to-physical address translating operation performed in the first storage space and the second storage space shown in FIG. 3.

Please refer to FIG. 5 in conjunction with FIG. 4. FIG. 5 is an implementation of a virtual-to-physical address translating operation performed in the first storage space 310 and the second storage space 320 shown in FIG. 3, wherein the address translating operation shown in FIG. 5 follows the address translating operation shown in FIG. 4. In this implementation, the aforementioned virtual-to-physical address translation system receives another write instruction, which is used to write a virtual-to-physical address translation (corresponding to a virtual address 0x0000_9000 and a physical address 0x8000_1000) into the buffer entry corresponding to the buffer index IND(6). As a bit pattern of the bits [15:14] (i.e. a virtual index) of the virtual address 0x0000_9000 is also '10', the processing circuit may direct to the translation entry corresponding to the translation index idx(2) and use the directed translation entry as the currently directed translation entry. As shown in FIG. 4, no virtual-to-physical address translation is stored in a slot in the way W2 of the currently directed translation entry (i.e. the currently directed translation entry is unoccupied), which means that the currently directed translation entry is available. Hence, the processing circuit may store the virtual address 0x0000_9000 and the physical address 0x8000_1000 in the virtual address field vaddr2 and physical address field paddr2, respectively, according to the operations described above with reference to FIG. 4. It should be noted that, as the physical page start field pa_start2 is 0x8000_0000, a page corresponding to the physical address 0x8000_1000 may be regarded as the second page of a physical page having the starting address 0x8000_0000, and the multi-page field is set to 0x2 (i.e. '0010' in binary) accordingly. For the sake of brevity, similar descriptions are not repeated here.

Figure 6:
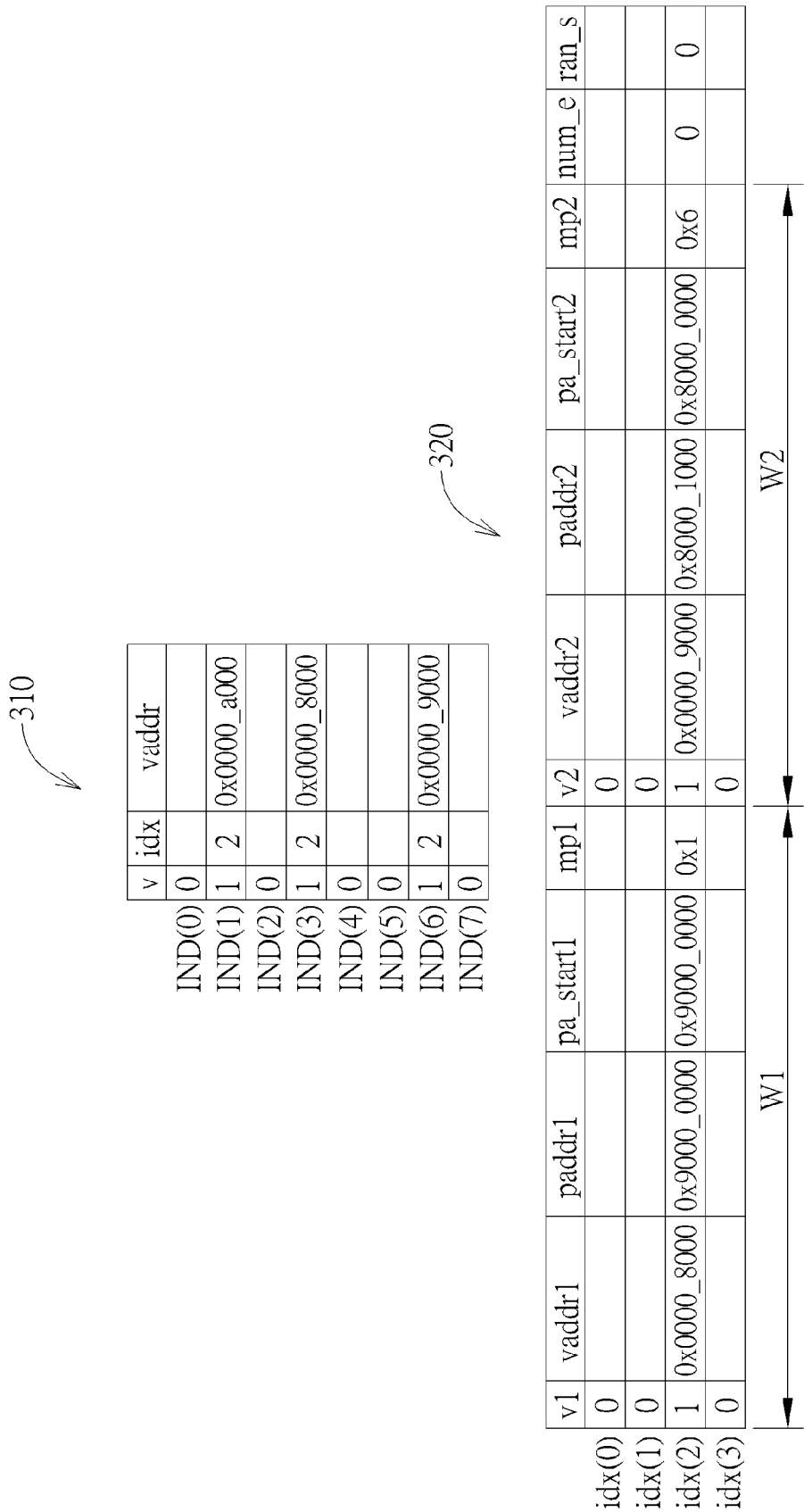
FIG. 6 is an implementation of a virtual-to-physical address translating operation performed in the first storage space and the second storage space shown in FIG. 3.

Please refer to FIG. 6 in conjunction with FIG. 5. FIG. 6 is an implementation of a virtual-to-physical address translating operation performed in the first storage space 310 and the second storage space 320 shown in FIG. 3, wherein the address translating operation shown in FIG. 6 follows the address translating operation shown in FIG. 5. In this implementation, the aforementioned virtual-to-physical address translation system receives another write instruction, which is used to write a virtual-to-physical address translation (corresponding to a virtual address 0x0000_a000 and a physical address 0x8000_2000) into the buffer entry corresponding to the buffer index IND(1). As a bit pattern of bits [15:14] of the virtual address 0x0000_a000 is also '10', the processing circuit may direct to the translation entry corresponding to the translation index idx(2) and use the directed translation entry as the currently directed translation entry. As shown in FIG. 5, although each slot corresponding to the currently directed translation entry is occupied, the processing circuit may determine if the virtual address 0x0000_a000 and the physical address 0x8000_2000 are adjacent to a virtual address and a physical address respectively, wherein both of the virtual address and the physical address correspond to a virtual-to-physical address translation stored in the currently directed translation entry. As the virtual address 0x0000_a000 and the physical address 0x8000_2000 are adjacent to the virtual address 0x0000_9000 and the physical address 0x8000_1000 respectively (i.e. a criterion for merging pages is met), the processing circuit may determine that the currently directed translation entry is still available, and store the virtual-to-physical address translation (corresponding to the virtual address 0x0000_a000 and the physical address 0x8000_2000) in the currently directed translation entry.

In practice, the processing circuit may update the multi-page field mp2 to 0x6 as shown in FIG. 6, wherein the updated multi-page field mp2 may be used as an operation result of storing the virtual-to-physical address translation (corresponding to the virtual address 0x0000_a000 and the physical address 0x8000_2000) in the currently directed translation entry. Please note that the data 0x6 stored in the multi-page field mp2 represents that the second page (corresponding to the physical address 0x8000_1000 whose bit pattern of the bits [13:12] is '01') and the third page (corresponding to the physical address 0x8000_2000 whose bit pattern of the bits [13:12] is '10') of the physical page having the starting address 0x8000_0000 are merged into a merged page. This means that two virtual-to-physical address translations (corresponding to the virtual address 0x0000_9000 and the virtual address 0x0000_a000 respectively) are stored in the translation entry corresponding to the translation index idx(2). For the sake of brevity, similar descriptions are not repeated here.

Figure 7:
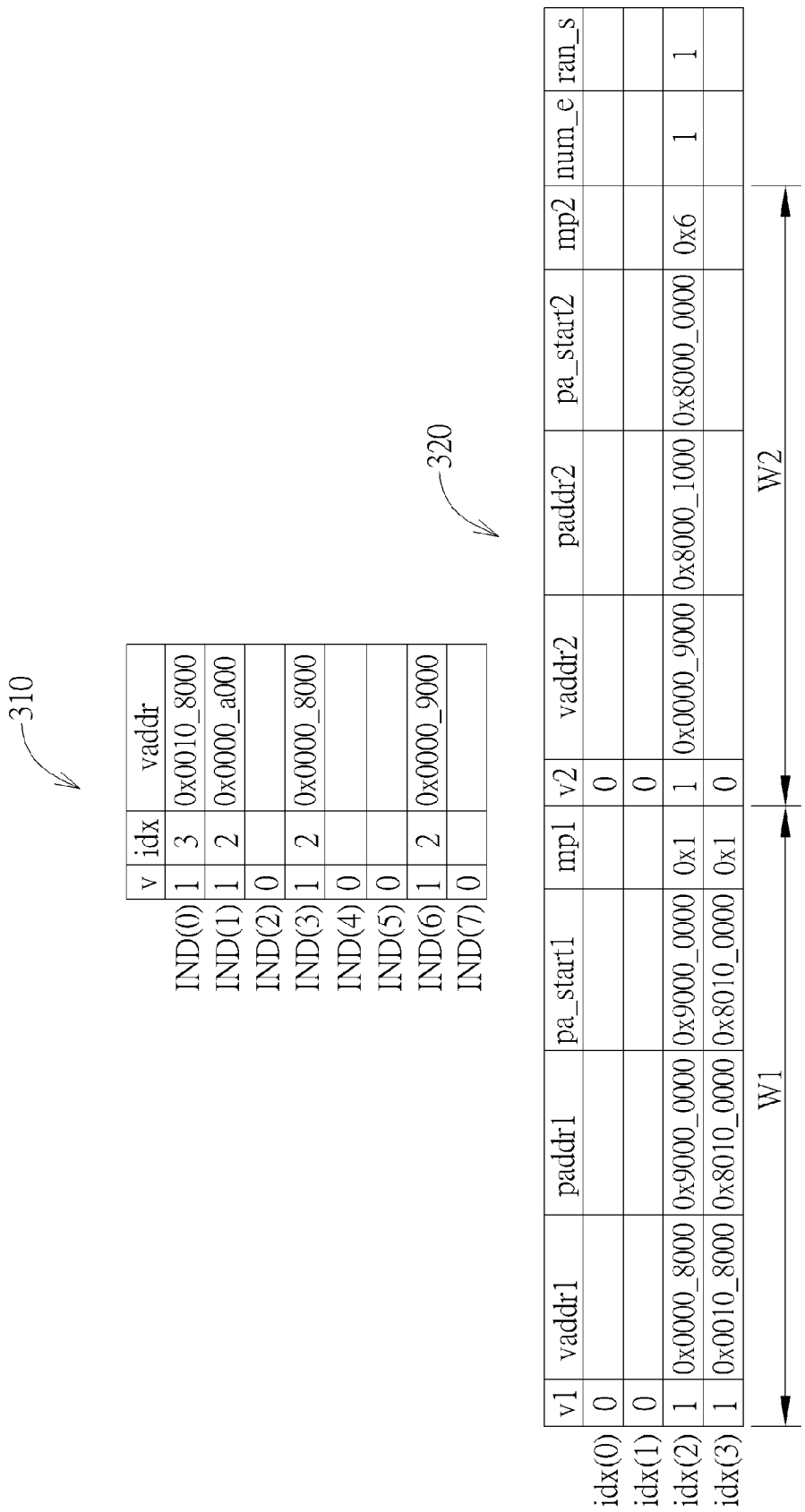
FIG. 7 is an implementation of a virtual-to-physical address translating operation performed in the first storage space and the second storage space shown in FIG. 3.

Please refer to FIG. 7 in conjunction with FIG. 6. FIG. 7 is an implementation of a virtual-to-physical address translating operation performed in the first storage space 310 and the second storage space 320 shown in FIG. 3, wherein the address translating operation shown in FIG. 7 follows the address translating operation shown in FIG. 6. In this implementation, the aforementioned virtual-to-physical address translation system receives another write instruction, which is used to write a virtual-to-physical address translation (corresponding to a virtual address 0x0010_8000 and a physical address 0x8010_0000) into the buffer entry corresponding to the buffer index IND(0). As a bit pattern of bits [15:14] of the virtual address 0x0010_8000 is also '10', the processing circuit may direct to the translation entry corresponding to the translation index idx(2) and use the directed translation entry as the currently directed translation entry. As shown in FIG. 6, each slot corresponding to the currently directed translation entry is occupied, and the virtual address 0x0010_8000 and the physical address 0x8010_0000 are not adjacent to a virtual address and a corresponding physical address stored in the currently directed translation entry respectively. Hence, the processing circuit may determine that the currently directed translation entry is unavailable, direct to another translation entry adjacent to the currently directed translation entry (e.g. the translation entry corresponding to the translation index idx(3)) so as to use the another translation entry as the currently directed translation entry, and repeat the step of determining if the currently directed translation entry is available (e.g. determining if the currently directed translation entry is occupied, or determining if there are any adjacent virtual address and physical address stored in the currently directed translation entry) to thereby generate the determination result.

As shown in FIG. 6, no virtual-to-physical address translation is stored in the translation entry corresponding to the translation index idx(3) so that the determination results indicates that the currently directed translation entry is available. The processing circuit may use the currently directed translation entry as the write translation entry, and store the virtual-to-physical address translation corresponding to the virtual address 0x0010_8000 and the physical address 0x8010_0000 in the currently directed translation entry. It should be noted that the processing circuit may further update the offset status field of the translation entry corresponding to the translation index idx(2). In practice, as shown in FIG. 7, the processing circuit may set the escape number field num_e to 1 and set the search range field ran_s to 1, wherein the search range field ran_s having the value 1 indicates that there is one translation entry between the currently directed translation entry (the translation entry corresponding to the translation index idx(3)) and the translation entry which was originally intended to store the current address translation (the translation entry corresponding to the translation index idx(2)), and the escape number field num_e having the value 1 indicates that there is one virtual-to-physical address translation stored in at least one other translation entry (e.g. the currently directed translation entry) due to unavailability of the translation entry which was originally intended to store the current address translation. In addition, as the virtual-to-physical address translation (corresponding to the virtual address 0x0010_8000 and the physical address 0x8010_0000) is stored in the translation entry corresponding to the translation index idx(3), the translation index field idx of the buffer entry corresponding to the buffer index IND(0) is set to 3.

Please note that the above implementations of translation entry selections are for illustrative purposes only. In an alternative design, when the determination result indicates that the currently directed translation entry (e.g. the translation entry corresponding to the translation index idx(2)) is unavailable, the processing circuit may direct to another adjacent translation entry (e.g. the translation entry corresponding to the translation index idx(1)) and use the adjacent translation entry as the currently directed translation entry for further processing. In view of the above, related virtual-to-physical address translations may be stored in adjacent translation entries so that system performance may be greatly improved. For the sake of brevity, similar descriptions are not repeated here.

Figure 8:
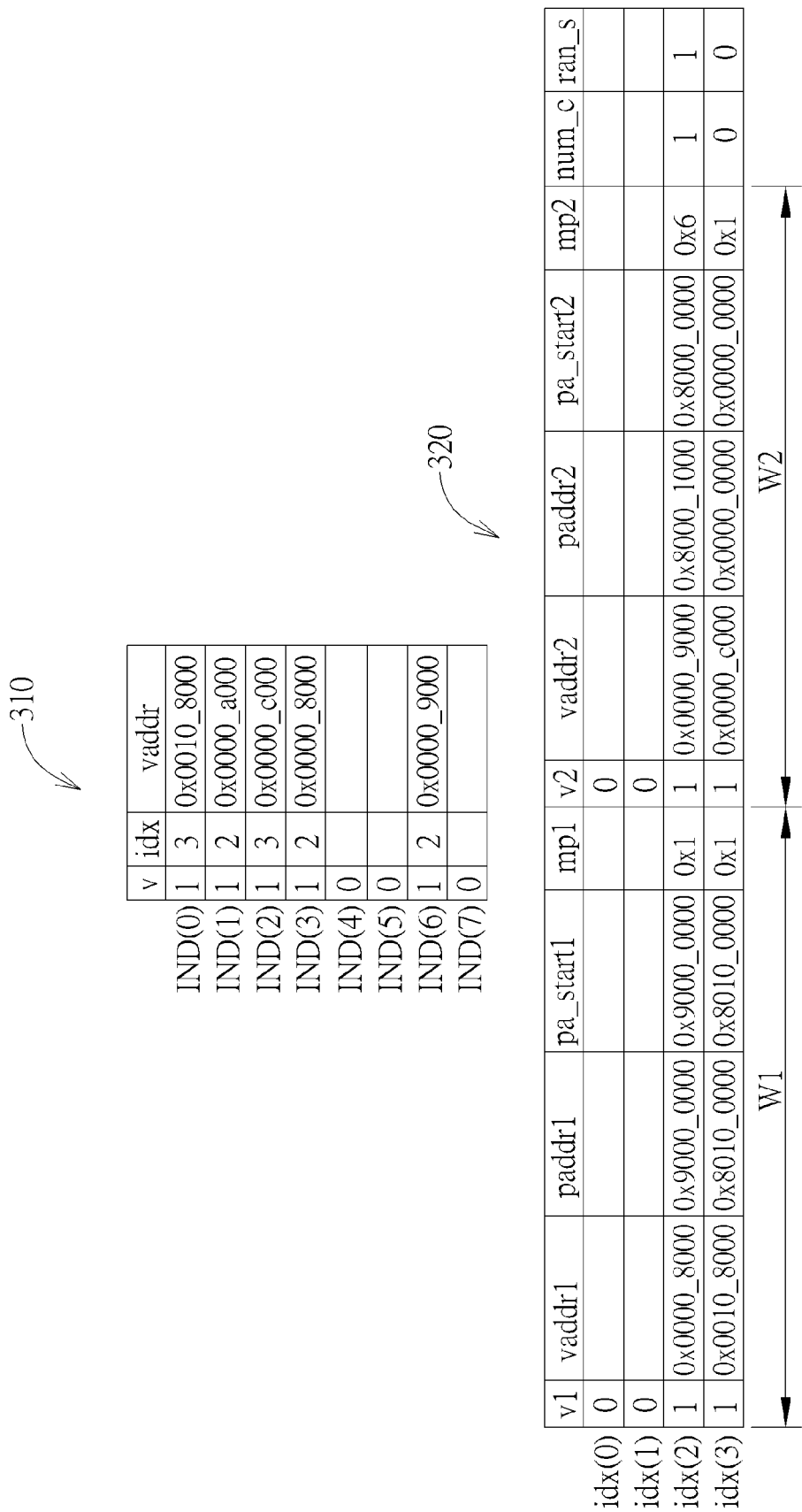
FIG. 8 is an implementation of a virtual-to-physical address translating operation performed in the first storage space and the second storage space shown in FIG. 3.

Please refer to FIG. 8 in conjunction with FIG. 7. FIG. 8 is an implementation of a virtual-to-physical address translating operation performed in the first storage space 310 and the second storage space 320 shown in FIG. 3, wherein the address translating operation shown in FIG. 8 follows the address translating operation shown in FIG. 7. In this implementation, the aforementioned virtual-to-physical address translation system receives another write instruction, which is used to write a virtual-to-physical address translation (corresponding to a virtual address 0x0000_c000 and a physical address 0x0000_0000) into the buffer entry corresponding to the buffer index IND(2). As a bit pattern of bits [15:14] of the virtual address 0x0000_c000 is also '11', the processing circuit may direct to the translation entry corresponding to the translation index idx(3) and use the directed translation entry as the currently directed translation entry. As shown in FIG. 4, no virtual-to-physical address translation is stored in a slot in the way W2 of the currently directed translation entry, the processing circuit may store the virtual address 0x0000_c000 and the physical address 0x0000_0000 in the virtual address field vaddr2 and physical address field paddr2, respectively, according to the operations described above with reference to FIG. 4. For the sake of brevity, similar descriptions are not repeated here.

Figure 9:
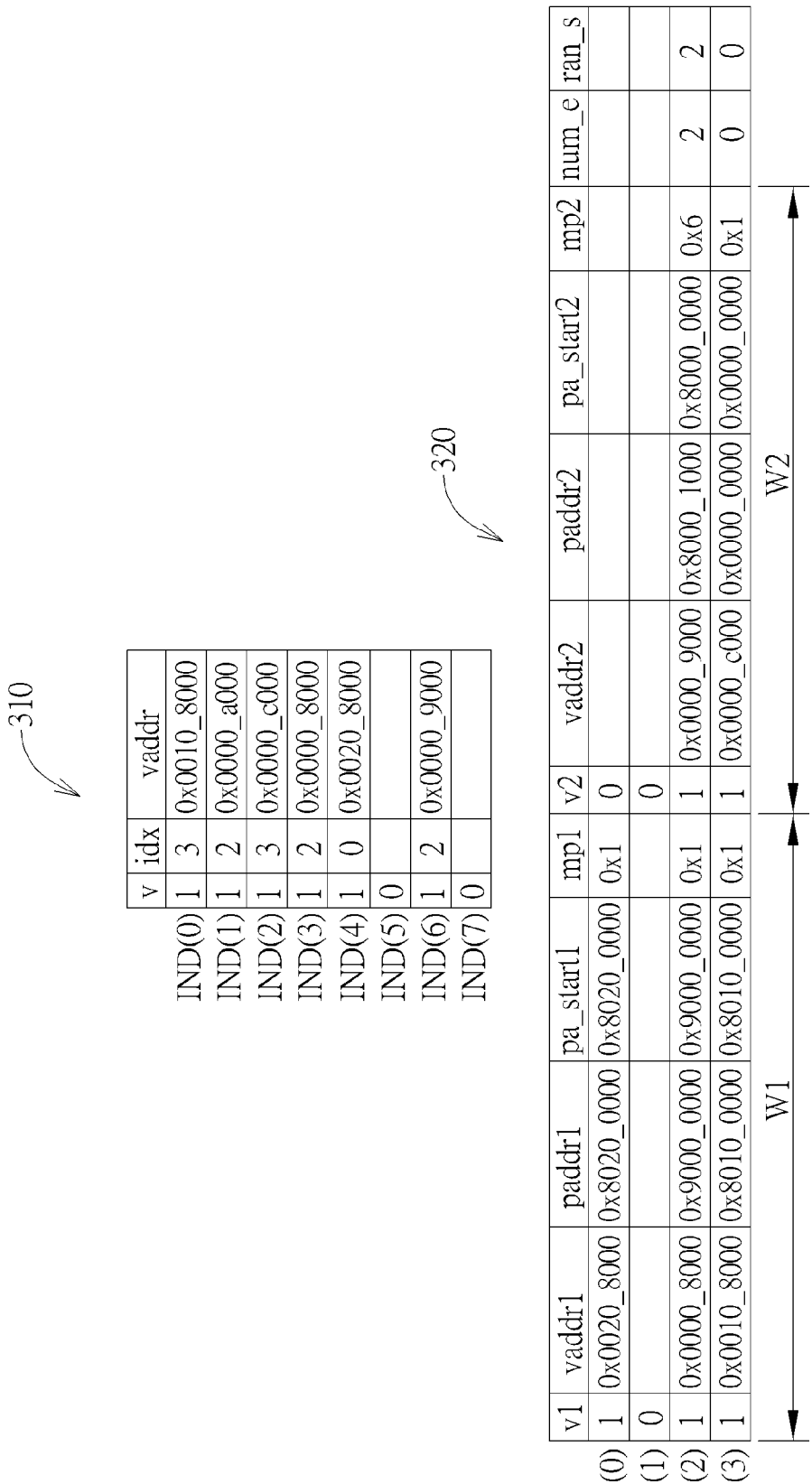
FIG. 9 is an implementation of a virtual-to-physical address translating operation performed in the first storage space and the second storage space shown in FIG. 3.

Please refer to FIG. 9 in conjunction with FIG. 8. FIG. 9 is an implementation of a virtual-to-physical address translating operation performed in the first storage space 310 and the second storage space 320 shown in FIG. 3, wherein the address translating operation shown in FIG. 9 follows the address translating operation shown in FIG. 8. In this implementation, the aforementioned virtual-to-physical address translation system receives another write instruction, which is used to write a virtual-to-physical address translation (corresponding to a virtual address 0x0020_8000 and a physical address 0x8020_0000) into the buffer entry corresponding to the buffer index IND(4). As a bit pattern of bits [15:14] of the virtual address 0x0020_8000 is also '10', the processing circuit may direct to the translation entry corresponding to the translation index idx(2) and use the directed translation entry as the currently directed translation entry. As shown in FIG. 8, each slot corresponding to the currently directed translation entry is occupied, and the virtual address 0x0020_8000 and the physical address 0x8020_0000 are not adjacent to a virtual address and a corresponding physical address stored in the currently directed translation entry respectively. Hence, the processing circuit may direct to another translation entry adjacent to the currently directed translation entry (e.g. the translation entry corresponding to the translation index idx(3)) so as to use the another translation entry as the currently directed translation entry. However, as the translation entry corresponding to the translation index idx(3) is also occupied and no criterion for merging pages is met, the processing circuit may direct to still another translation entry adjacent to the currently directed translation entry (i.e. the translation entry corresponding to the translation index idx(0)).

As shown in FIG. 8, no virtual-to-physical address translation is stored in the translation entry corresponding to the translation index idx(0). Hence, the processing circuit may use the currently directed translation entry as the write translation entry and store the virtual-to-physical address translation (corresponding to the virtual address 0x0010_8000 and the physical address 0x8010_0000) in the currently directed translation entry. Similarly, regarding the translation entry corresponding to the translation index idx(2), the processing circuit may further update the escape number field num_e to 1 and update the search range field ran_s to 1 as shown in FIG. 9. For the sake of brevity, similar descriptions are not repeated here.

Please note that the above is for illustrative purposes only, and is not meant to be a limitation of the present invention. For example, the number of bits of a virtual address associated with a page range, a merged page and/or a virtual index may be adjusted according to actual design requirements. In addition, the aforementioned implementation of the multi-page field is not meant to be a limitation. For example, it is feasible to utilize bit patterns of only two bits (i.e. '00', '01', '10' and '11') to indicate respective page numbers of four pages. Further, the above implementation of the offset status field is not meant to be a limitation of the present invention. For example, the offset status field may store a byte, wherein the first four bits (the 4 LSBs) of the byte may correspond to the escape number field num_e, and the last four bits may correspond to the search range field ran_s.

In addition to write performance, the proposed virtual-to-physical address translation system may improve lookup/read performance. Please refer to FIG. 9 again. In this implementation, when the virtual-to-physical address translation system corresponding to the first storage space 310 and the second storage space 320 receives a read instruction to read out a physical address corresponding to a virtual address 0x0020_8000, the processing circuit may read out the physical address from the second storage space 320 according to a part of bits (e.g. bits [15:14]) of the virtual address 0x0020_8000.

For example, the processing circuit may refer to a bit pattern '10' of the bits [15:14] of the virtual address 0x0020_8000 to direct to a specific translation entry corresponding to the translation index idx(2). Next, the processing circuit may compare the virtual address 0x0020_8000 with the respective virtual addresses 0x0000_8000, 0x0000_9000 and 0x0000_a000 of the virtual-to-physical address translations stored in the specific translation entry. When the virtual address 0x0020_8000 may be found in the specific translation entry, the processing circuit may read out the physical address from the specific translation entry. When the processing circuit does not find any matched virtual address in the specific translation entry, the processing circuit may further refer to the offset status field of the specific translation entry to read out the physical address from another translation entry. In this implementation, as the processing circuit does not find the virtual address 0x0020_8000 in the specific translation entry, the processing circuit may try to read out the physical address according to the number field num_e and the search range field ran_s of the specific translation entry.

The search range field ran_s of the specific translation entry is set to 2, meaning that there are two virtual-to-physical address translations stored in at least one other translation entry due to unavailability of the specific translation entry. The number field num_e of the specific translation entry is set to 2, meaning that there are at most two translation entries between the specific translation entry and the at least one other translation entry. Hence, the processing circuit may direct to the translation entry corresponding to the translation index idx(3) and the translation entry corresponding to the translation index idx(0) in sequence in order to check if there is any matched virtual address. In this implementation, the processing circuit may find a matched virtual address in the translation entry corresponding to the translation index idx(0), and then read out the physical address (i.e. the physical address 0x8020_0000).

Figure 10:
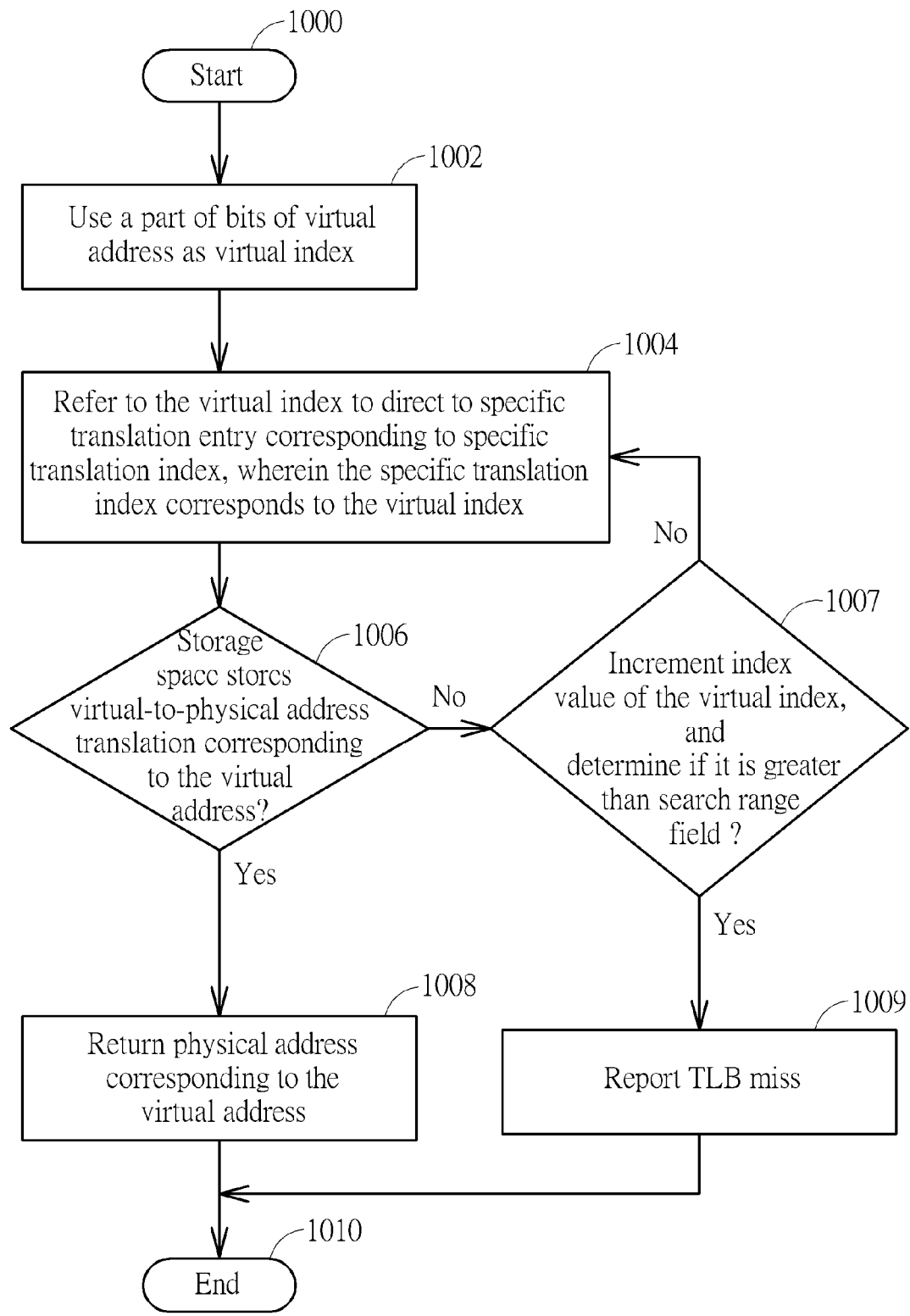
FIG. 10 is a flow chart of an exemplary management method of a virtual-to-physical address translation system according to an embodiment of the present invention.

In this implementation, when the received read instruction is used to readout a physical address corresponding to a virtual address 0x0020_c000, a person skilled in the art after reading the above paragraphs should understand that the processing circuit does not find any matched virtual address. Hence, the processing circuit may report a TLB miss. In other words, the proposed virtual-to-physical address translation system may be compatible with a MIPS The aforementioned lookup operations are described in FIG. 10. FIG. 10 is a flow chart of an exemplary management method of a virtual-to-physical address translation system according to an embodiment of the present invention. The exemplary method may be used for looking up a virtual-to-physical address translation stored in a storage space (e.g. the physical address corresponding to the virtual address 0x0020_8000 stored in the storage space 320 shown in FIG. 9), and may be summarized below.

Step 1000: Start.

Step 1002: Use a part of bits of a virtual address as a virtual index. For example, the used virtual index may correspond to the bit pattern '10' of the bits [15:14] of the virtual address 0x0020_8000 shown in FIG. 9 to obtain the virtual index.

Step 1004: Refer to the virtual index to direct to a specific translation entry corresponding to a specific translation index (e.g. the translation entry corresponding to the translation index idx(2)), wherein the specific translation index corresponds to the virtual index.

Step 1006: Determine if the storage space stores the virtual-to-physical address translation corresponding to the virtual address. If yes, go to step 1008; otherwise, go to step 1007.

Step 1007: Increment an index value of the virtual index (e.g. updating the bit pattern of the virtual index to '11'), and determine if a difference between an incremented index value (e.g. 3) and the index value corresponding to the part of the bits of the virtual address (e.g. the index value 2 corresponding to the translation index idx(2)) is greater than a search range field of the translation entry corresponding to the part of the bits of the virtual address (e.g. the search range field ran_s corresponding to the translation index idx(2)). If yes, go to step 1009; otherwise, go to step 1004.

Step 1008: Return a physical address corresponding to the virtual address.

Step 1009: Report a TLB miss.
Step 1010: End.

For example, consider the case where the proposed method is used to look up the physical address corresponding to the virtual address 0x0020_8000 shown in FIG. 9. In step 1007, when the bit pattern of the virtual index is updated from '10' to '11', the corresponding index value is updated from 2 to 3. In addition, a difference between the incremented index value 3 and the index value 2 of the translation index idx(2) may be compared with the search range field ran_s corresponding to the translation index idx(2) so as to determine whether to refer to the updated virtual index to direct to another translation entry. If the difference is smaller than (or equal to) the search range field, it is likely that the translation entry corresponding to the updated virtual index (corresponding to the translation index idx(3)) has stored the virtual-to-physical address translation which should have been stored in the translation entry corresponding to the translation index idx(2). Hence, step 1004 is repeated. However, if the difference is greater than the search range field, it means that the translation entry corresponding to the updated virtual index (corresponding to the translation index idx(3)) does not store the virtual-to-physical address translation which should have been stored in the translation entry corresponding to the translation index idx(2). Hence, step 1009 is executed to report a TLB miss. As a person skilled in the art should understand the operation of each step shown in FIG. 10 after reading the above paragraphs directed to FIGS. 1-9, further description is omitted here for brevity.

Figure 11:
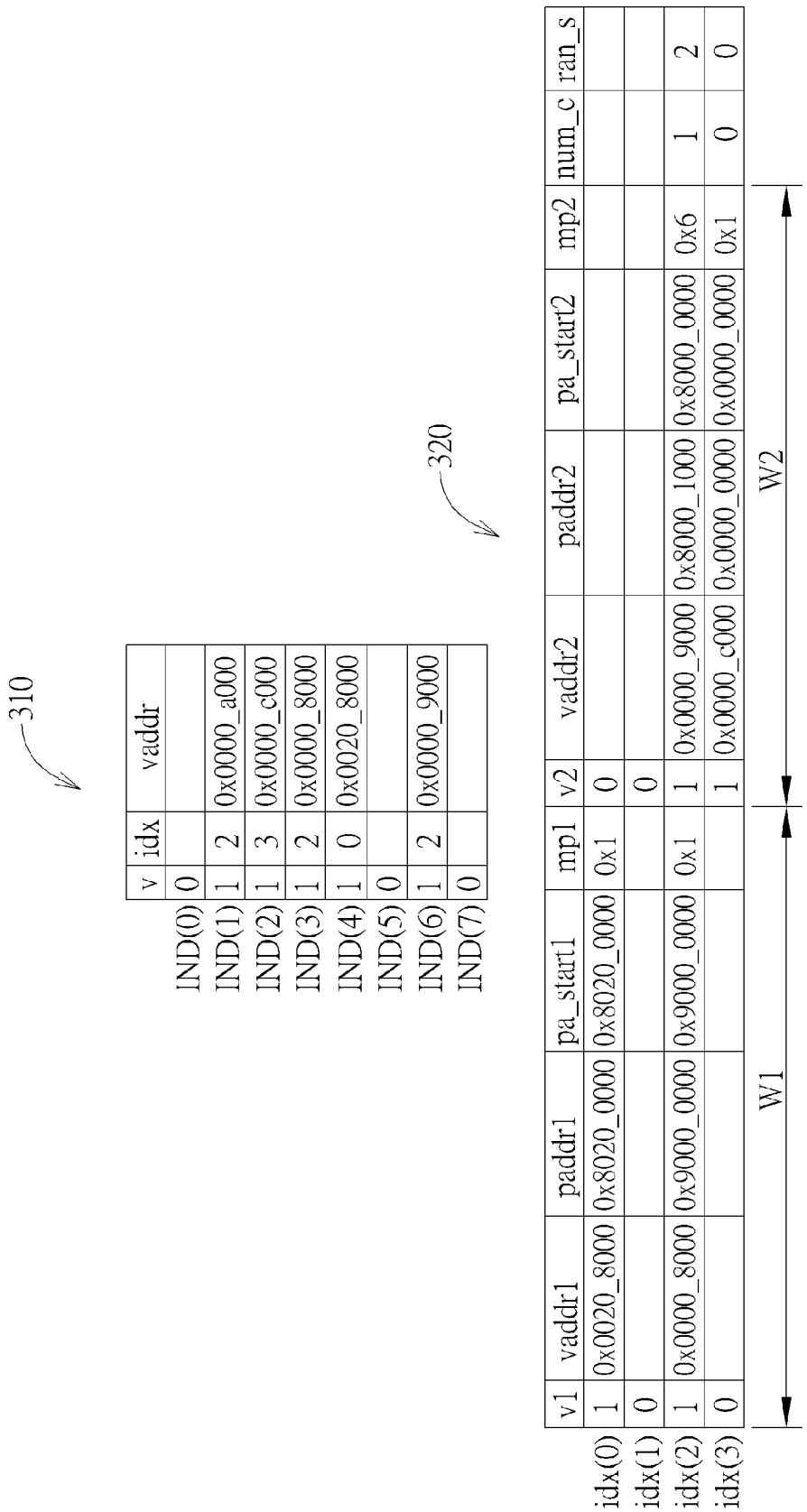
FIG. 11 is an implementation of a virtual-to-physical address translating operation performed in the first storage space and the second storage space shown in FIG. 3.

Moreover, before referring to a part of bits of a virtual address to perform the aforementioned write operations, the processing circuit may further check if a specific buffer entry to be written is available. If the specific buffer entry is available, the processing circuit may perform the aforementioned write operations. Otherwise, if the specific buffer entry is unavailable (e.g. a specific virtual-to-physical address translation corresponding to a specific virtual address has been stored), the processing circuit may first delete the specific virtual-to-physical address translation stored in the specific buffer entry and the specific virtual-to-physical address translation stored in the second storage space, and then write a virtual-to-physical address translation corresponding to the virtual address into the specific buffer entry and the second storage space. Please refer to FIG. 11 in conjunction with FIG. 9. FIG. 11 is an implementation of a virtual-to-physical address translating operation performed in the first storage space 310 and the second storage space 320 shown in FIG. 3, wherein the address translating operation shown in FIG. 11 follows the address translating operation shown in FIG. 9. In this implementation, the aforementioned virtual-to-physical address translation system receives another write instruction, which is used to write a virtual-to-physical address translation (corresponding to a virtual address 0x0000_4000 and a physical address 0x0000_0000) into a specific buffer entry (i.e. the buffer entry corresponding to the buffer index IND(0)). As shown in FIG. 9, the specific buffer entry has stored translation information corresponding to the virtual address 0x0010_8000. Hence, the processing circuit first of all has to delete a specific virtual-to-physical address translation associated with the virtual address 0x0010_8000 stored in the first storage space 310 and the second storage space 320.

In practice, the processing circuit may compare a specific translation index stored in the specific buffer entry (i.e. the index value 3 of the translation index idx(3)) with a part of the bits of the virtual address 0x0010_8000 (i.e. the bits [15:14]), and accordingly delete the specific virtual-to-physical address translation stored in the first storage space 310 and the second storage space 320.

When the specific translation index corresponds to the bits [15:14] of the virtual address 0x0010_8000, it means that the specific virtual-to-physical address translation is stored in a predetermined translation entry. In order to completely delete the specific virtual-to-physical address translation, the processing circuit may delete the specific virtual-to-physical address translation stored in a specific translation entry (corresponding to the specific translation index) of the second storage space 320 (e.g. updating the valid bit field, the virtual address field, the physical address field, the physical page start field and/or the multi-page field), delete the virtual address 0x0010_8000 and the specific translation index stored in the first storage space 310, and update the valid bit field of the specific buffer entry.

However, in this implementation, as the specific translation index does not correspond to the virtual the bits [15:14] of the virtual address 0x0010_8000, it means that the specific virtual-to-physical address translation is not stored in the predetermined translation entry. Hence, the processing circuit may further update the offset status field of the predetermined translation entry. As shown in FIG. 11, the specific virtual-to-physical address translation stored in the buffer entry (corresponding to the buffer index IND(0)) and the specific virtual-to-physical address translation stored in the translation entry (corresponding to the translation index idx(3)) are deleted. Additionally, the processing circuit updates the escape number field num_e of the translation entry corresponding to the translation index idx(2) to 1.

Figure 12:
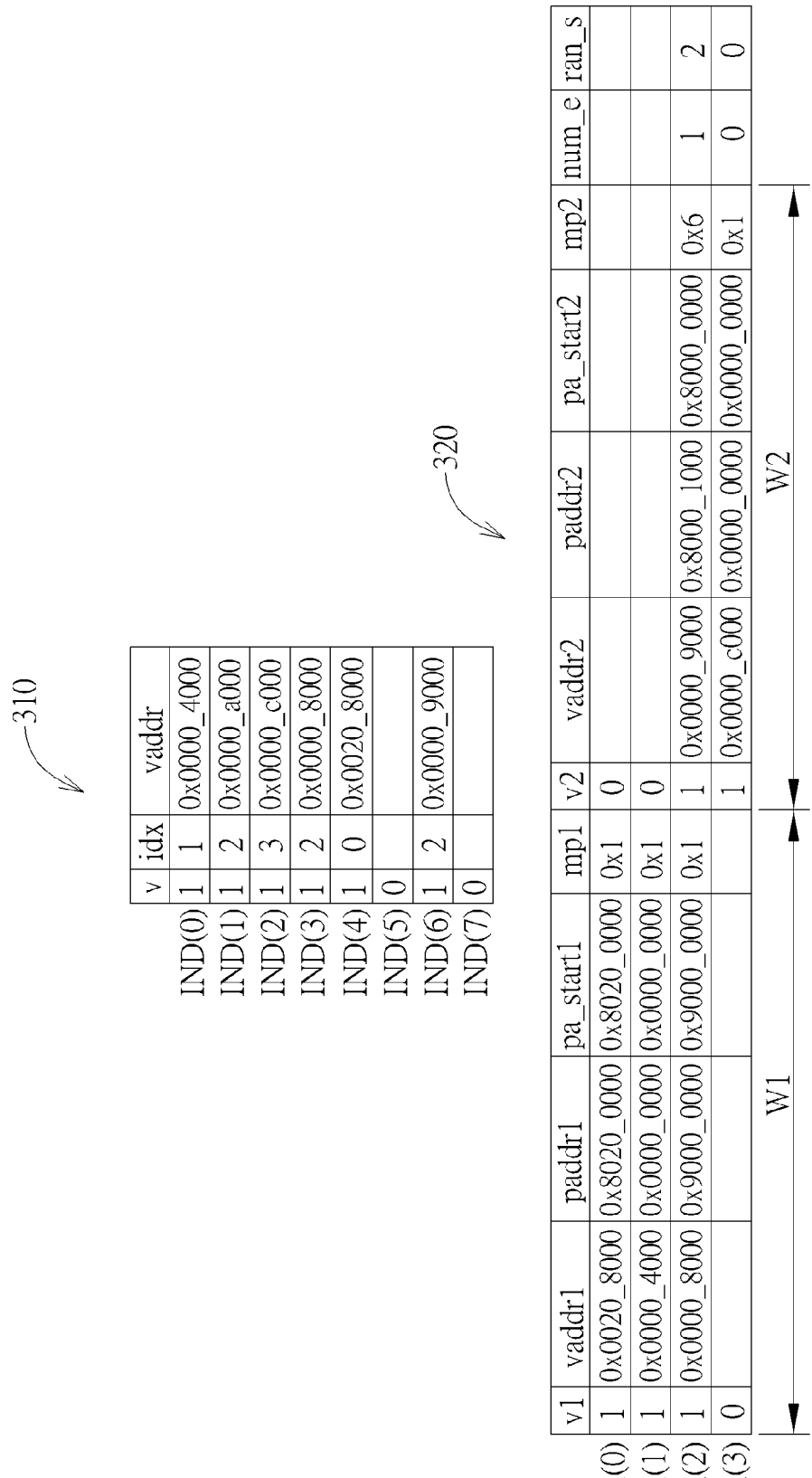
FIG. 12 is an implementation of a virtual-to-physical address translating operation performed in the first storage space and the second storage space shown in FIG. 3.

Next, as shown in FIG. 12, the processing circuit may store the virtual-to-physical address translation corresponding to the virtual address 0x0000_4000 and the physical address 0x0000_0000 in the first storage space 310 and the second storage space 320. As a person skilled in the art should understand the address translating operations after reading the above paragraphs directed to FIGS. 3-9, further description is omitted here for brevity.

Figure 13:
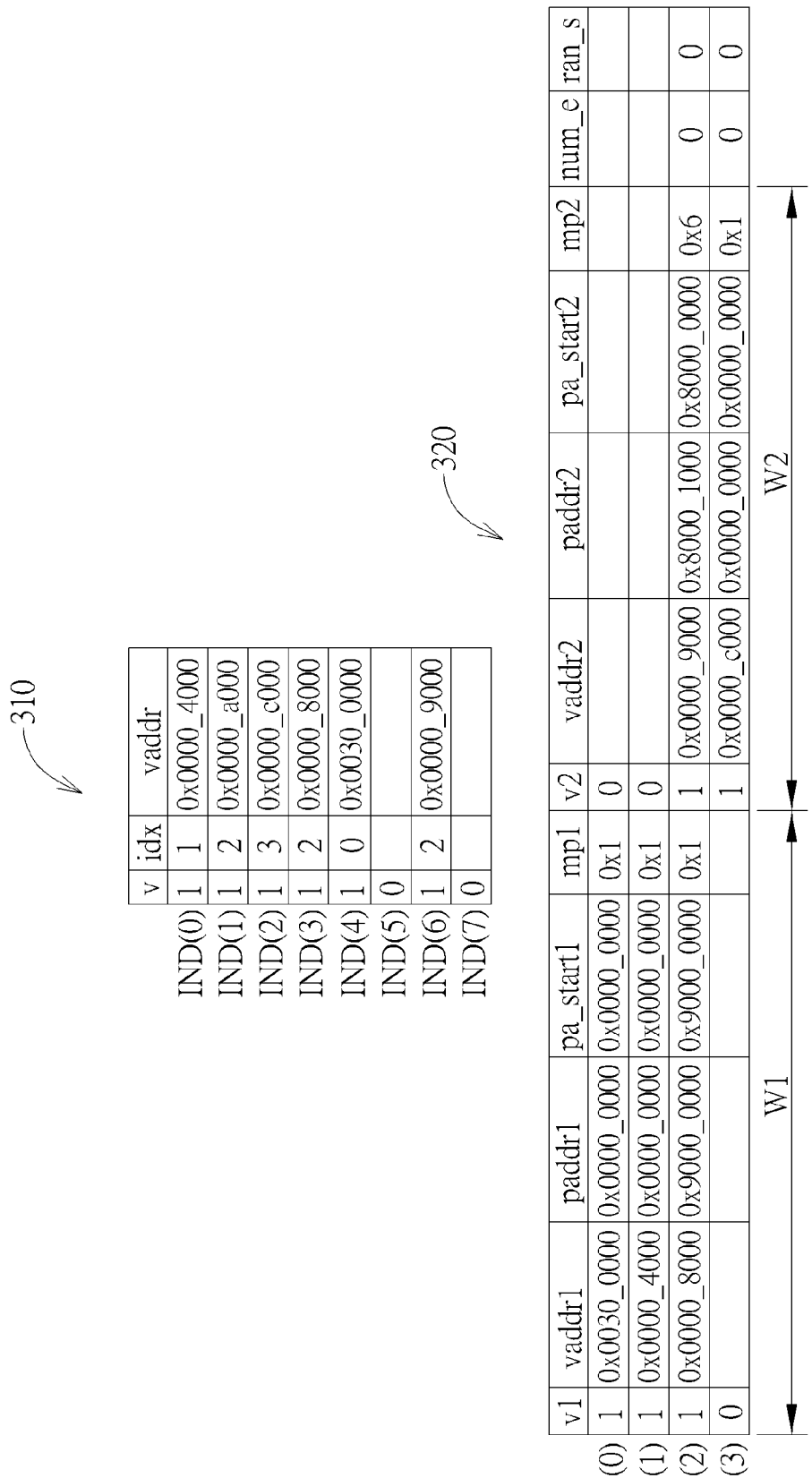
FIG. 13 is an implementation of a virtual-to-physical address translating operation performed in the first storage space and the second storage space shown in FIG. 3.

Please refer to FIG. 13 in conjunction with FIG. 12. FIG. 13 is an implementation of a virtual-to-physical address translating operation performed in the first storage space 310 and the second storage space 320 shown in FIG. 3, wherein the address translating operation shown in FIG. 13 follows the address translating operation shown in FIG. 12. In this implementation, the aforementioned virtual-to-physical address translation system receives another write instruction, which is used to write a virtual-to-physical address translation (corresponding to a virtual address 0x0030_0000 and a physical address 0x0000_0000) into a specific buffer entry (i.e. the buffer entry corresponding to the buffer index IND(4)). As shown in FIG. 12, the specific buffer entry has stored translation information corresponding to the virtual address 0x0020_8000. Hence, the processing circuit first of all has to delete a specific virtual-to-physical address translation associated with the virtual address 0x0020_8000 stored in the first storage space 310 and the second storage space 320, and then write the virtual-to-physical address translation (corresponding to the virtual address 0x0030_0000 and the physical address 0x0000_0000) into the first storage space 310 and the second storage space 320.

It should be noted that, due to the deletion of the specific virtual-to-physical address translation associated with the virtual address 0x0020_8000, the processing circuit may update the escape number field num_e of the translation entry corresponding to the translation index idx(2) to 0 (as shown in FIG. 13). This means that no address translation escapes from the translation entry corresponding to the translation index idx(2). Hence, the processing circuit updates the search range field ran_s of the translation entry corresponding to the translation index idx(2) to 0. As a person skilled in the art should understand the address translating operations after reading the above paragraphs directed to FIGS. 3-12, further description is omitted here for brevity.

Figure 14:
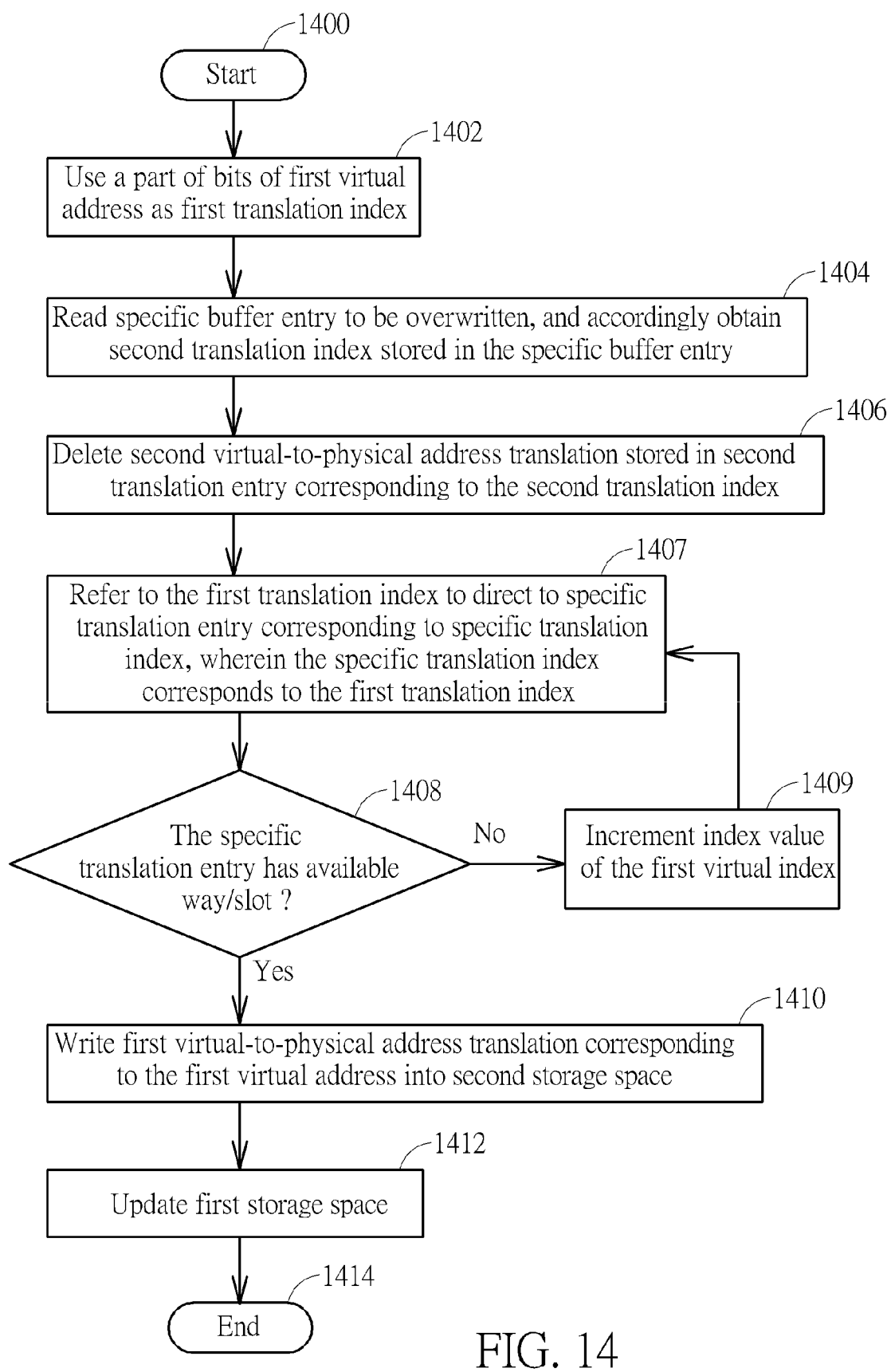
FIG. 14 is a flow chart of an exemplary management method of a virtual-to-physical address translation system according to an embodiment of the present invention.

Please refer to FIG. 9, FIG. 11, FIG. 12 and FIG. 14 together. FIG. 14 is a flow chart of an exemplary management method of a virtual-to-physical address translation system according to an embodiment of the present invention. The exemplary method may be used for writing a virtual-to-physical address translation into a storage space (e.g. writing the virtual-to-physical address translation associated with the virtual address 0x0000_4000 into the buffer entry corresponding to the buffer index IND(0)), and may be summarized below.

Step 1400: Start.

Step 1402: Use a part of bits of a first virtual address (e.g. the bits [15:14] of the virtual address 0x0000_4000) as first translation index (i.e. a virtual index).

Step 1404: Read a specific buffer entry to be overwritten (e.g. the buffer entry corresponding to the buffer index IND(0)), and accordingly obtain a second translation index stored in the specific buffer entry (e.g. the translation index having the index value 3).

Step 1406: Delete a second virtual-to-physical address translation stored in a second translation entry corresponding to the second translation index (e.g. the translation entry corresponding to the translation index idx(3) in the second storage space 320).

Step 1407: Refer to the first translation index to direct to a specific translation entry corresponding to a specific translation index (e.g. the translation entry corresponding to the translation index idx(1) in the second storage space 320), wherein the specific translation index corresponds to the first translation index Step 1408: Determine if the specific translation entry has an available way/slot. If yes, go to step 1410; otherwise, go to step 1409.

Step 1409: Increment an index value of the first virtual index.

Step 1410: Write a first virtual-to-physical address translation corresponding to the first virtual address into a second storage space. For example, the virtual-to-physical address translation corresponding to the virtual address 0x0000_4000 is written into the translation entry corresponding to the translation index idx(1).

Step 1412: Update a first storage space. For example, the virtual-to-physical address translation corresponding to the virtual address 0x0000_4000 is written into the buffer entry corresponding to the buffer index IND(0).

Step 1414: End.

As a person skilled in the art should understand the operation of each step shown in FIG. 14 after reading the above paragraphs directed to FIGS. 1-13, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management method of a virtual-to-physical address translation system, comprising:

providing a first storage space, wherein the first storage space comprises a plurality of buffer entries;

providing a second storage space, wherein the second storage space comprises a plurality of translation entries, and the translation entries correspond to a plurality of translation indices; and when receiving a write instruction to write a first virtual-to-physical address translation into a specific buffer entry of the buffer entries, using a first part of bits of a first virtual address corresponding to the first virtual-to-physical address translation as a virtual index and referring to the virtual index to direct to a write translation index in order to store the first virtual-to-physical address translation in a write translation entry of the translation entries corresponding to the write translation index according to the first part of bits of the first virtual address corresponding to the first virtual-to-physical address translation, and storing the first virtual address and the write translation index corresponding to the write translation entry in the specific buffer entry.

2. The management method of claim 1, wherein the step of storing the first virtual-to-physical address translation in the write translation entry comprises:

storing the first virtual address and a first physical address corresponding to the first virtual address in the write translation entry according to the first part of the bits of the first virtual address.

3. The management method of claim 1, wherein at least one of the translation entries comprises a plurality of slots, and the slots are arranged for storing a plurality of virtual-to-physical address translations.

4. The management method of claim 1, wherein the translation indices correspond to a plurality bit patterns respectively, and the bit patterns are formed according to the number of bits of the first part of the bits of the first virtual address.

5. The management method of claim 4, wherein the step of storing the first virtual-to-physical address translation in the write translation entry comprises:

referring to a bit pattern of the first part of the bits of the first virtual address to direct to a first translation entry of the translation entries, and using the first translation entry of the translation entries as a currently directed translation entry, wherein a first translation index of the first translation entry corresponds to the bit pattern of the first part of the bits;

determining if the currently directed translation entry is available, and accordingly generating a determination result; and storing the first virtual-to-physical address translation in the write translation entry according to the determination result.

6. The management method of claim 5, wherein when the determination result indicates that the currently directed translation entry is available, the step of storing the first virtual-to-physical address translation in the write translation entry according to the determination result comprises:

using the currently directed translation entry as the write translation entry, and storing the first virtual-to-physical address translation in the currently directed translation entry.

7. The management method of claim 5, wherein the step of determining if the currently directed translation entry is available comprises:

determining if the currently directed translation entry is occupied;

wherein when the currently directed translation entry is not occupied, the determination result indicates that the currently directed translation entry is available.

8. The management method of claim 7, wherein the step of determining if the currently directed translation entry is available comprises:
when the currently directed translation entry is occupied, determining if the first virtual address and the first physical address are adjacent to a second virtual address and a second physical address respectively, wherein the second virtual address and the second physical address correspond to a second virtual-to-physical address translation stored in the currently directed translation entry;
wherein when the first virtual address and the first physical address are adjacent to the second virtual address and the second physical address respectively, the determination result indicates that the currently directed translation entry is available.

9. The management method of claim 8, wherein the currently directed translation entry comprises a multi-page field, and when the determination result indicates that the currently directed translation entry is available, the step of storing the first virtual-to-physical address translation in the write translation entry according to the determination result comprises:
updating the multi-page field to be used as an operation result of storing the first virtual-to-physical address translation in the currently directed translation entry, wherein the currently directed translation entry is the write translation entry.

10. The management method of claim 9, wherein the step of updating the multi-page field to be used as the operation result of storing the first virtual-to-physical address translation in the currently directed translation entry comprises:
updating the multi-page field according to a part of bits of the first physical address and a part of bits of the second physical address such that the updated multi-page field indicates page numbers respectively corresponding to the first physical address and the second physical address, wherein the part of the bits of the first physical address corresponds to a second part of the bits of the first virtual address, and the part of the bits of the second physical address corresponds to a second part of the bits of the second virtual address;
wherein a location of the second part of the bits of the first virtual address in the first virtual address is identical to a location of the second part of the bits of the second virtual address in the second virtual address.

11. The management method of claim 5, wherein when the determination result indicates that the currently directed translation entry is unavailable, the step of storing the first virtual-to-physical address translation in the write translation entry of the translation entries according to the first part of the bits of the first virtual address corresponding to the first virtual-to-physical address translation further comprises:
direct to a second translation entry adjacent to the currently directed translation entry so as to use the second translation entry as the currently directed translation entry, and repeating the step of determining if the currently directed translation entry is available and accordingly generating the determination result.

12. The management method of claim 11, wherein each translation entry comprises an offset status field; after the step of determining if the currently directed translation entry is available is repeated and when the determination result indicates that the currently directed translation entry is available, the step of storing the first virtual-to-physical address translation in the write translation entry according to the determination result comprises:
using the currently directed translation entry as the write translation entry so as to store the first virtual-to-physical address translation in the currently directed translation entry, and updating an offset status field of the first translation entry, wherein the updated offset status field indicates the number of translation entries between the currently directed translation entry and the first translation entry, and indicates the number of virtual-to-physical address translations stored in the currently directed translation entry due to unavailability of the first translation entry.

13. The management method of claim 1, wherein when receiving the write instruction to write the first virtual-to-physical address translation into the specific buffer entry of the buffer entries, the management method further comprises:
checking if the specific buffer entry is available; and
when the specific buffer entry has stored a specific translation index and a specific virtual address and before the first virtual-to-physical address translation is written into the specific buffer entry, comparing the specific translation index with a first part of bits of the specific virtual address and accordingly deleting a specific virtual-to-physical address translation corresponding to the specific virtual address stored in the first storage space and the second storage space, wherein a location of the first part of the bits of the specific virtual address in the specific virtual address is identical to a location of the first part of the bits of the first virtual address in the first virtual address.

14. The management method of claim 13, wherein the step of deleting the specific virtual-to-physical address translation corresponding to the specific virtual address stored in the first storage space and the second storage space comprises:
deleting the specific virtual-to-physical address translation stored in a specific translation entry corresponding to the specific translation index in the second storage space; and
deleting the specific virtual address and the specific translation index stored in the first storage space.

15. The management method of claim 14, wherein the first part of the bits of the specific virtual address corresponds to a first translation index of the translation indices, and a first translation entry corresponding to the first translation index comprises an offset status field; the offset status field indicates the number of virtual-to-physical address translations stored in at least one second translation entry due to unavailability of the first translation entry, and indicates the number of translation entries between the at least one second translation entry and the first translation entry; and when the specific translation entry does not correspond to the first part of the bits of the specific virtual address, the step of deleting the specific virtual-to-physical address translation corresponding to the specific virtual address stored in the first storage space and the second storage space comprises:
updating the offset status field of the first translation entry.

16. The management method of claim 1, wherein when the translation entries store at least one virtual-to-physical address translation, the management method further comprises:
when receiving a read instruction to read out a specific physical address corresponding to a specific virtual address, using a part of bits of the specific virtual address as a specific virtual index and referring to the specific virtual index to direct to a specific translation index corresponding to a specific translation entry of the translation entries in order to read out the specific physical address from the second storage space according to the part of bits of the specific virtual address.

17. The management method of claim 16, wherein the step of reading out the specific physical address from the second storage space according to the part of the bits of the specific virtual address comprises:

comparing the specific virtual address with at least one virtual address of at least one virtual-to-physical address translation stored in the specific translation entry, and accordingly reading out the specific physical address.

18. The management method of claim 17, wherein the specific translation entry comprises an offset status field; the offset status field indicates the number of virtual-to-physical address translations stored in at least one other translation entry due to unavailability of the specific translation entry, and indicates the number of translation entries between the at least one other translation entry and the specific translation entry; and when the specific virtual address is not stored in the specific translation entry, the step of reading out the specific physical address from the second storage space comprises:

reading out the specific physical address from the at least one other translation entry according to the offset status field.

* * * * *